US009985482B2

(12) United States Patent
Yoshida et al.

(10) Patent No.: US 9,985,482 B2
(45) Date of Patent: May 29, 2018

(54) WIRELESS POWER TRANSMISSION CONTROL DEVICE, WIRELESS POWER TRANSMISSION SYSTEM, AND WIRELESS POWER TRANSMISSION CONTROL METHOD

(71) Applicant: NEC Corporation, Tokyo (JP)

(72) Inventors: Shuhei Yoshida, Tokyo (JP); Masahiro Tanomura, Tokyo (JP); Kaoru Shizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 123 days.

(21) Appl. No.: 15/110,836

(22) PCT Filed: Jan. 15, 2015

(86) PCT No.: PCT/JP2015/000162
§ 371 (c)(1),
(2) Date: Jul. 11, 2016

(87) PCT Pub. No.: WO2015/115041
PCT Pub. Date: Aug. 6, 2015

(65) Prior Publication Data
US 2016/0336805 A1    Nov. 17, 2016

(30) Foreign Application Priority Data

Jan. 29, 2014   (JP) ................ 2014-013892

(51) Int. Cl.
*H02J 50/12* (2016.01)
*H02J 17/00* (2006.01)
(Continued)

(52) U.S. Cl.
CPC .............. *H02J 50/12* (2016.02); *H02J 7/025* (2013.01); *H02J 7/042* (2013.01); *H02J 17/00* (2013.01);
(Continued)

(58) Field of Classification Search
CPC .......... H02J 50/80; H02J 50/90; B63G 8/001; B63G 2008/002; B63G 2008/004
See application file for complete search history.

(56) References Cited

U.S. PATENT DOCUMENTS

2010/0007214 A1*   1/2010   Howard ................ B60L 11/182
                                                                  307/104
2012/0306433 A1   12/2012   Kim et al.
(Continued)

FOREIGN PATENT DOCUMENTS

EP    2 790 294 A1   10/2014
EP    2 838 174 A1   2/2015
(Continued)

OTHER PUBLICATIONS

International Search Report corresponding to PCT/JP2015/000162, dated Apr. 7, 2015 (4 pages).
(Continued)

*Primary Examiner* — Jeffrey Shin
(74) *Attorney, Agent, or Firm* — Wilmer Cutler Pickering Hale and Dorr LLP

(57) ABSTRACT

In order to stably supply power even under a condition such that variations in a transmission environment occur constantly and irregularly in a wireless power transmission, a wireless power transmission control device of the present invention includes: a data collection means for obtaining data indicating the characteristics of a transmission medium for wireless transmission of power via a receiving antenna provided in a movable body; a data prediction means for deriving predicted transmission characteristics that predict a change in the characteristics of the transmission medium by using the data and for calculating a control parameter corresponding to the predicted transmission characteristics; and a parameter control means for controlling the movable
(Continued)

body and the receiving antenna by using the control parameter.

10 Claims, 20 Drawing Sheets

(51) Int. Cl.
    *H02J 50/80*     (2016.01)
    *H02J 50/90*     (2016.01)
    *H02J 7/02*     (2016.01)
    *H02J 7/04*     (2006.01)

(52) U.S. Cl.
    CPC ............. *H02J 50/80* (2016.02); *H02J 50/90* (2016.02); *B64C 2201/066* (2013.01)

(56) References Cited

U.S. PATENT DOCUMENTS

| | | | |
|---|---|---|---|
| 2013/0241468 A1* | 9/2013 | Moshfeghi | H02J 7/025 320/107 |
| 2014/0015333 A1 | 1/2014 | Byun et al. | |
| 2014/0232200 A1 | 8/2014 | Maekawa | |
| 2015/0002092 A1 | 1/2015 | Niizuma | |
| 2015/0333540 A1* | 11/2015 | Niizuma | H02J 17/00 114/312 |
| 2015/0333800 A1* | 11/2015 | Perry | G10K 11/346 320/108 |

FOREIGN PATENT DOCUMENTS

| | | |
|---|---|---|
| JP | 2013-219972 A | 10/2013 |
| JP | 2015-056954 A | 3/2015 |
| WO | WO-2012/145327 A1 | 10/2012 |
| WO | WO-2013/085030 A1 | 6/2013 |

OTHER PUBLICATIONS

Extended European Search Report issued by the European Patent Office for European Application No. 15743455.6 dated May 22, 2017 (7 pages).

* cited by examiner

WIRELESS POWER TRANSMISSION CONTROL DEVICE, WIRELESS POWER TRANSMISSION SYSTEM, AND WIRELESS POWER TRANSMISSION CONTROL METHOD

CROSS-REFERENCE TO RELATED APPLICATIONS

This application is a national stage application of International Application No. PCT/JP2015/000162 entitled "Wireless Power Transmission Control Device, Wireless Power Transmission System, and Wireless Power Transmission Control Method" filed on Jan. 15, 2015, which claims priority to Japanese Patent Application No. 2014-013892, filed on Jan. 29, 2014, the disclosures of each which are hereby incorporated by reference in their entirety.

TECHNICAL FIELD

The present invention relates to a control device for wireless power transmission, a wireless power transmission system, and a control method of wireless power transmission, and more particularly, to a control device for wireless power transmission, a wireless power transmission system, and a control method of wireless power transmission in an environment in which a control target moves in the air, the water or the like.

BACKGROUND ART

As a system which wirelessly transmits power (a wireless power transmission system), a system using an electromagnetic induction phenomenon is being explored. In addition to the system using the electromagnetic induction phenomenon, a system using a resonance phenomenon of magnetic field energy (magnetic field resonance) has also been proposed as a wireless power transmission system. The system using the magnetic field resonance has characteristics that no trade-off relation occurs between transmission distance and transmission efficiency, as compared with the wireless power transmission system using the electromagnetic induction phenomenon. Therefore, the system using the resonance of the magnetic field energy is expected to be a promising technology for charging an electric apparatus such as a cellular phone and an EV (Electric Vehicle).

In the wireless power transmission system using the magnetic field resonance, it is important to have a technology for compensating for a change in power transmission characteristics which results from changes in the relative positional relation between a power transmitting antenna and a power receiving antenna, or the condition of a medium existing between antennas (hereinafter, also called a transmission medium). This is because, when the relative positional relation between the power transmitting and receiving antennas or the condition of the medium is changed, the amount of magnetic flux passing through the power receiving antenna is changed, resulting in a change in a frequency and a load at which maximum power transmission efficiency is obtained (an optimal frequency and an optimal load, respectively).

FIG. 10 is a conceptual diagram illustrating a relation between power transmission efficiency and frequency in a resonance system. FIG. 10 illustrates the relation between power transmission efficiency and frequency in the cases where the distance between the power transmitting antenna and the power receiving antenna is a DISTANCE a (a solid line) and a DISTANCE b (a broken line). That is, according to the distance between the power transmitting and receiving antennas, the relation between power transmission efficiency and frequency changes, resulting in a shift of an optimal frequency at which power transmission is maximum. In addition, it has been known that such a shift of the optimal frequency is caused by a change in a resonance condition, that is, a change in a coupling condition of magnetic flux.

A technology for compensating for such a change in the resonance condition is particularly important as a technology for efficiently charging a movable body such as an EV. For example, when an EV is parked close to a source installed on the ground, the parking position of the EV varies depending on the driver. Therefore, the relative positional relation (the distance and angle) between the power transmitting antenna mounted on the source installed on the ground and the power transmitting and receiving antennas mounted on the EV changes every time the EV is charged. Accordingly, it is important to have a technology for compensating for a change in the resonance condition (a change in the coupling condition of the magnetic flux).

In order to compensate for the change in the resonance condition, a circuit system (a control device) has been considered which adjusts circuit constants (capacities) of a power transmitting antenna and a power receiving antenna so as to optimally adjust frequencies of the antennas and loads. Moreover, a system has been known which, in order to enhance the accuracy of compensation and responsiveness, calculates a control direction for an optimal frequency, that is, a system that determines, by calculating differential values of power transmission characteristics with respect to frequency, whether the control should be performed to increase or to decrease the frequency so as to arrive at an optimal frequency. An example of such a control device, for example, is disclosed in PTL1.

PTL1 discloses a system, a method, and an apparatus for adjusting a wireless power transmitter. The wireless power transmitter includes as an example a transmission circuit having a transmission coil and wirelessly supplies power to a load by the transmission circuit. Herein, the transmission coil resonates at a predetermined resonant frequency. Furthermore, the transmission circuit has a circuit constant (reactance). The wireless power transmitter includes a detection circuit that detects a change in a resonant frequency while the power is being supplied to the load and can adjust the reactance on the basis of a change in the resonant frequency.

CITATION LIST

Patent Literature

[PTL1] International Publication No. 2012/145327

SUMMARY OF INVENTION

Technical Problem

FIG. 11 is a block diagram for explaining the concept of frequency control of wireless power transmission according to a related art. Furthermore, FIG. 12A is a graph illustrating transmission efficiency ($\eta$) of wireless power transmission in relation to frequency (f) for the purpose of explaining a related art for optimally controlling frequency characteristics of the wireless power transmission, and the circle in the drawing indicates an operation point at a time $T_0$. FIG. 12B is a graph illustrating transmission efficiency ($\eta$) of wireless power transmission in relation to frequency (f), and the circle in the drawing indicates an operation point at a time $T_0+T_{11}$. FIG. 12C is a graph illustrating transmission efficiency ($\eta$) of wireless power transmission in relation to frequency (f), and the circle in the drawing indicates an operation point at a time $T_0+T_{21}$. FIGS. 12A to 12C illustrate how a change in a resonance condition is compensated. Details are as follows. First, an EV is parked in the vicinity of a power transmitting antenna at the time $T_0$. The symbol "○" in FIG. 12A indicates an operation point (an operation frequency) at the present time. Next, the EV detects power transmission efficiency $\eta_{out}$ at present (an output end of FIG. 11) by a method such as communication with a monitor of reflected power at a power transmitting antenna terminal or a power receiving antenna. Subsequently, f control is performed by feeding back the detected $\eta_{out}$ (through the feedback path from the output end to the input end of FIG. 11) and, on the basis of a difference with target power transmission efficiency $\eta_{cmd}$ (the input end of FIG. 11), determining a control gain f ($\Delta\eta$) and a frequency control direction (toward a higher frequency direction or a lower frequency direction) (f($\Delta\eta$) and f control of FIG. 11). Next, at the time $T_0+T_{11}$, a frequency generation circuit performs frequency control on the basis of the control gain and the frequency control direction (the f generation circuit of FIG. 11). Then, the operation point (the operation frequency) of the power transmission efficiency starts to change from the present value (FIG. 12B). Subsequently, the EV detects the power transmission efficiency ($\eta_{out}$ again (the output end of FIG. 11). The feedback is repeated as the aforementioned f control and re-setting of the power transmission efficiency are performed. Such feedback control is represented by the control concept illustrated in FIG. 11. The feedback ceases when transmission is performed at the optimal frequency, that is, when $\eta_{cmd}$ is obtained (at the time $T_0+T_{21}$) (FIG. 12C). As described above, the related control device calculates the control direction for an optimal frequency from the differential values of power transmission characteristics with respect to frequency and controls frequency and load according to the calculated results.

However, the related control device has the following problems. The related control device is mounted, for example, on a helicopter, an AUV (Autonomous Underwater Vehicle), an electronic apparatus held by a moving person, and the like, which are equipped with a power transmitting antenna or a power receiving antenna constituting a wireless power transmission system. When wireless power transmission is performed for a helicopter or an AUV operated in the air, the water or the like, or an electronic apparatus held by a person (hereinafter, in a case, also called movable bodies) and the like, changes in the surrounding environment as well as motions of the movable bodies and the like occur constantly and irregularly due to wind, buoyancy, tidal current and the like. With the related control device, it is difficult to perform follow-up control in response to frequency and load changes caused by the changes in the surrounding environment as well as motions of the movable bodies (hereinafter, in a case, also called an environmental changes); therefore, it is difficult to achieve stable compensation. This is because, unlike the wireless power transmission for an EV operated on land, wireless power transmission for a movable body operated in the air, the water and the like is subjected to a large influence over the power transmission characteristics by the changes in the environment in which to conduct the wireless power transmission. More specifically, the following influence is anticipated.

FIG. 13 is a diagram for explaining a change in transmission characteristics when environmental changes occur constantly and irregularly in a wireless power transmission system. That is, FIG. 13 illustrates a relation between frequency and power transmission efficiency before (a time $T_0$) and after (a time $T_0+T_{22}$) the motion of a movable body has occurred in wireless power transmission in the water. In FIG. 13, the solid line and the broken line indicate wireless power transmission characteristics at the time $T_0$ and the time $T_0+T_{22}$, respectively. Furthermore, FIG. 14A is a graph illustrating transmission efficiency ($\eta$) of wireless power transmission in relation to frequency (f) at the present time point for the purpose of explaining frequency control according to a related art when an environmental change occurs in wireless power transmission (under the water), and the circle in the drawing indicates an operation point at a time $T_0$. FIG. 14B is a graph illustrating transmission efficiency ($\eta$) of wireless power transmission in relation to frequency (f) at the present time point, and the circle in the drawing indicates an operation point at a time $T_0+T_{12}$. FIG. 14C is a graph illustrating transmission efficiency ($\eta$) (a predicted value) at the time $T_0+T_{12}$ of wireless power transmission in relation to frequency (f), and the circle in the drawing indicates an operation point at the time $T_0+T_{12}$. FIG. 14D is a graph illustrating transmission efficiency ($\eta$) (a predicted value) of wireless power transmission in relation to frequency (f) at a time when frequency control direction should be determined anew, and the circle in the drawing indicates an operation point in the control direction that should be selected when determined anew. At the beginning, control is performed with predetermined power transmission efficiency and frequency (FIG. 14A). Thereafter, at the time $T_0+T_{12}$, frequency control is started (FIG. 14B). Further, when a motion of the movable body occurs at a time $T_0+T_{22}$, power transmission characteristics change (FIG. 14C), and if the direction of the frequency control is maintained unchanged, the power transmission characteristics deteriorate. Consequently, a problem arises in that transmission efficiency is not improved. That is, although a frequency is allowed to follow the optimization direction calculated by the related control device, the transmission efficiency is not improved. The direction of the frequency control needs to be determined anew as illustrated in FIG. 14D. However, since motions of the movable body occur constantly and irregularly, the related control device cannot perform control for following up the motions, and it is difficult to perform frequency control so as to obtain the frequency which corresponds to the optimal condition for maximizing power transmission. As described above, with the related control device, a problem arises in the follow-up control being unable to respond to frequency and load changes necessitated by environmental changes.

The above-described problems occur particularly when using an unmanned helicopter flying in the air or an AUV driven in the water, that is, when a positional relation constantly changes between an apparatus equipped with a power transmitting antenna and an apparatus equipped with a power receiving antenna, for, with a mobile apparatus such as an EV traveling on the ground, if the apparatus comes to a halt, a positional relation between the mobile apparatus equipped with a power transmitting antenna and an apparatus equipped with a power receiving antenna barely changes.

An object of the present invention is to provide a wireless power transmission control device, a wireless power transmission system, and a wireless power transmission control method, which enables to solve a problem as described above, that it is difficult to stably supply power by wireless power transmission in a situation where transmission environment changes constantly and irregularly.

Solution to Problem

A control device for wireless power transmission of the present invention, includes data collection means for acquiring data indicating a characteristic of a transmission medium when power is wirelessly transmitted via a power receiving antenna provided to a movable body; data prediction means for deriving a predicted transmission characteristic by predicting a change in the characteristic of a transmission medium by using data and calculates a control parameter corresponding to the predicted transmission characteristic; and parameter control means for performing control of a movable body and a power receiving antenna by using a control parameter.

A control method of wireless power transmission of the present invention, includes: acquiring data indicating a characteristic of a transmission medium when power is wirelessly transmitted via a power receiving antenna provided to a movable body; deriving a predicted transmission characteristic by predicting a change in the characteristic of the transmission medium by using data; calculating a control parameter corresponding to the predicted transmission characteristic; and performing control of a movable body and a power receiving antenna by using the control parameter.

A wireless power transmission system of the present invention, includes a movable body comprising the control device for wireless power transmission and the power receiving antenna; and a power transmitting device which wirelessly transmits power to the movable body, wherein the control device for wireless power transmission determines transmission information comprising a frequency of the wireless power transmission and a target value of power transmission efficiency, and the movable body transmits the transmission information to the power transmitting device.

Advantageous Effect of Invention

According to the present invention, it is possible to control wireless power transmission by using control parameters corresponding to predicted future environmental changes. As a consequence, even in an aerial, underwater, or other environment in which environmental changes continuously occur, it is possible to stably supply power.

DESCRIPTION OF EMBODIMENTS

Figure 1:
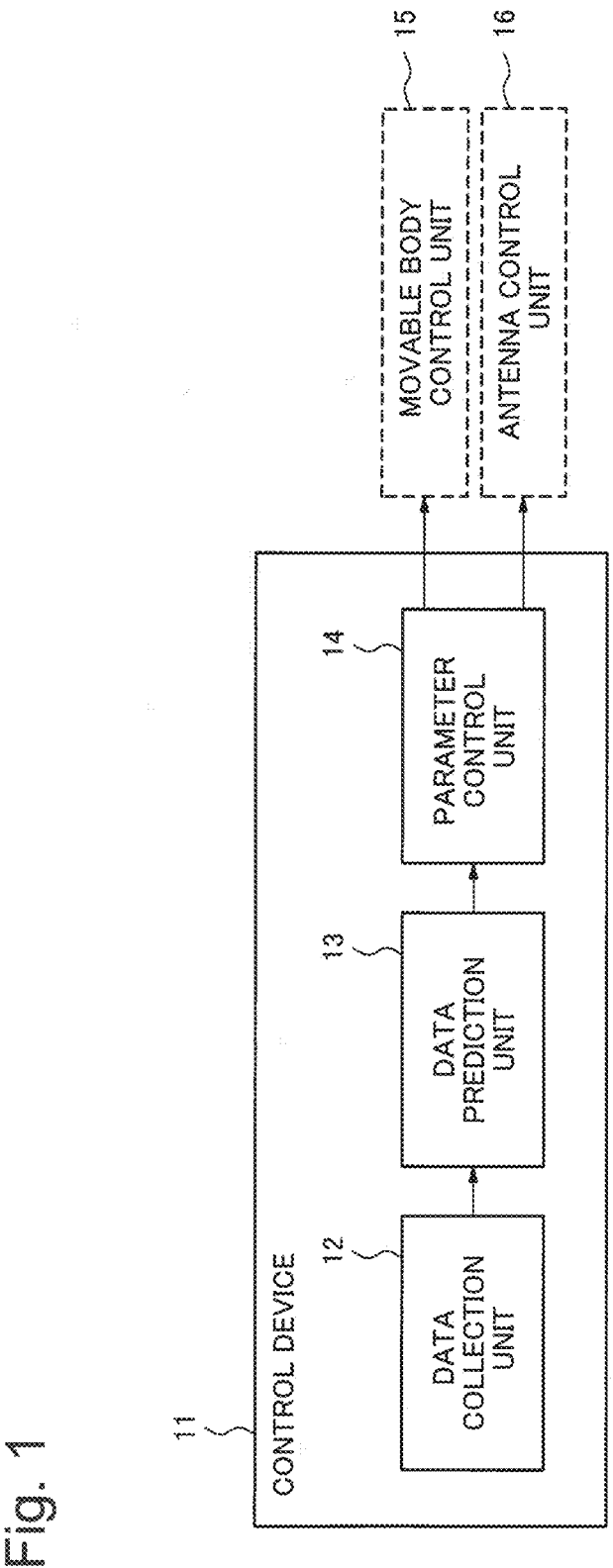
FIG. 1 is a block diagram illustrating a configuration of a control device of wireless power transmission according to a first exemplary embodiment of the present invention.

Next, exemplary embodiments of the present invention will be described with reference to the drawings. It should be noted that, in the following description, the same reference numerals are used to designate elements having the same functions, and descriptions thereof will be omitted.

First Exemplary Embodiment

FIG. 1 is a block diagram illustrating a configuration of a control device 11 of wireless power transmission according to a first exemplary embodiment of the present invention. The control device 11 in the present exemplary embodiment has a data collection unit 12, a data prediction unit 13, and a parameter control unit 14. The control device 11 is mounted on a movable body such as an unmanned helicopter, an AUV or the like. Hereinafter, each element will be described.

The data collection unit 12 acquires data regarding environmental changes occurring in an environment in which power is wirelessly transmitted. An environmental change refers to a change due to a position, an angle and the like of a movable body, and a change over time of environmental temperature, a dielectric constant, permeability and the like of a transmission medium around the movable body. Furthermore, the data collection unit 12 includes a sensor for measuring the condition of the movable body and the condition of an external environment of the movable body.

The data prediction unit 13 predicts a future environmental change from the data collected by the data collection unit 12. Furthermore, the parameter control unit 14 controls a movable body control unit 15 and an antenna control unit 16 on the basis of control parameters estimated by the data prediction unit 13. As a consequence, the control is performed over the position and the like of the movable body wirelessly receiving power as well as a power receiving antenna provided to the movable body.

More specifically, the data collection unit 12 is composed of a gyro sensor, a temperature sensor, a pressure sensor and the like and a peripheral circuit for driving these sensors. Furthermore, the data prediction unit 13 can be composed of a dedicated circuit or a processor, a program and the like and a peripheral circuit for driving the processor, program and the like, for estimating control parameters on the basis of prediction. Furthermore, the parameter control unit 14 can be composed of a dedicated circuit or a processor, a program and the like and a peripheral circuit for driving the processor, program and the like, for controlling one or both of the movable body control unit 15 and the antenna control unit 16.

Next, the operation of the control device 11 in the present exemplary embodiment will be sequentially described. First, the data collection unit 12 measures the condition of the movable body and the condition of the external environment of the movable body by using the above-described sensors. The measured condition information is made into data and is transmitted to the data prediction unit 13. Next, the data prediction unit 13 receives the data sent from the data collection unit 12. Next, the data prediction unit 13 estimates the future of an environmental change by using the received data. Next, the data prediction unit 13 determines control parameters corresponding to the estimated condition of the external environment. The determined control parameters are made into data and are transmitted to the parameter control unit 14. Next, the parameter control unit 14 receives the determined control parameters. Based on the control parameters, the parameter control unit 14 controls the movable body control unit 15 and the antenna control unit 16. As described above, the data prediction unit 13 derives predicted transmission characteristics, by predicting a change in the characteristics of a transmission medium by using data indicating the characteristics of the transmission medium, and calculates control parameters corresponding to the prediction transmission characteristics.

The data prediction unit 13 can estimate future environmental changes by using the following various methods. For example, the data prediction unit 13 can estimate future environmental changes by plotting the acquired sensor data on a time axis and using an extrapolation method. Furthermore, the data prediction unit 13 can estimate future environmental changes by plotting the acquired sensor data on a time axis and comparing the sensor data with a data table accumulated up to now. Furthermore, the data prediction unit 13 can estimate future environmental changes by performing Fourier transform on the acquired sensor data and monitoring changes of each frequency component.

Furthermore, the data prediction unit 13 can determine the control parameters corresponding to the estimated future environmental changes by using various methods. For example, the data prediction unit 13 can determine optimal control parameters by using a full searching method or a hill climbing method. Moreover, the data prediction unit 13 can also use a genetic algorithm method. By using the genetic algorithm method, even when there are many control parameters, the data prediction unit 13 can determine the control parameters with favorable convergence performance in a short search time.

Effects

Next, effects of the control device 11 according to the present exemplary embodiment will be described. It is considered that, for example, the control device 11 of the present exemplary embodiment is applied to wireless power transmission in the seawater. In the seawater, it is assumed that a temperature of the seawater changes constantly and irregularly. When the temperature of the seawater changes, the conductivity of the seawater changes. When the conductivity of the seawater changes, the load conditions of power transmitting and receiving antennas change. Therefore, in order to stably perform wireless power transmission, compensation corresponding to the changes is necessary. It should be noted that, although the temperature change of the seawater will be described below as an example of a factor for environmental changes, factors for environmental changes are not limited thereto. It goes without saying that similar control is possible and similar effects are obtained when a change occurs in various factors such as the position and posture of a movable body and a dielectric constant and permeability of a surrounding transmission medium.

Figure 2:
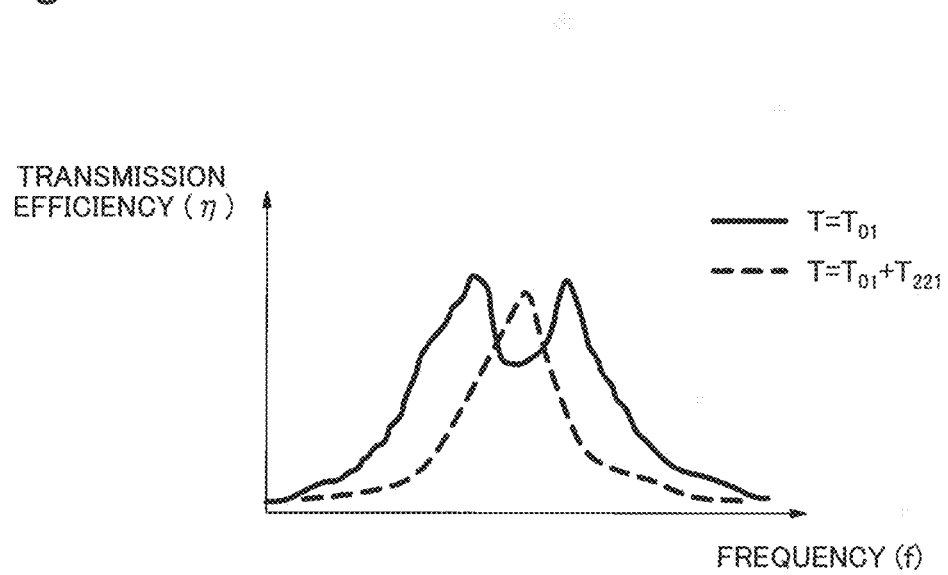
FIG. 2 is a diagram for explaining a change in transmission characteristics of a control device of wireless power transmission according to a first exemplary embodiment of the present invention when a temperature change has occurred in seawater.

FIG. 2 is a characteristic diagram illustrating a relation between frequency and power transmission efficiency before the temperature change of the seawater occurs (a time $T_{01}$), and after the temperature change of the seawater has occurred (a time $T_{01}+T_{221}$) during the wireless power transmission in the seawater. A solid line denotes wireless power transmission characteristics at the time $T_{01}$ and a broken line denotes wireless power transmission characteristics at the time $T_{01}+T_{221}$. Furthermore, FIG. 3A is a graph illustrating transmission efficiency ($\eta$) of wireless power transmission in relation to frequency (f) at the present time point, and the circle in the drawing indicates an operation point at the time $T_{01}$.

Figure 3A:
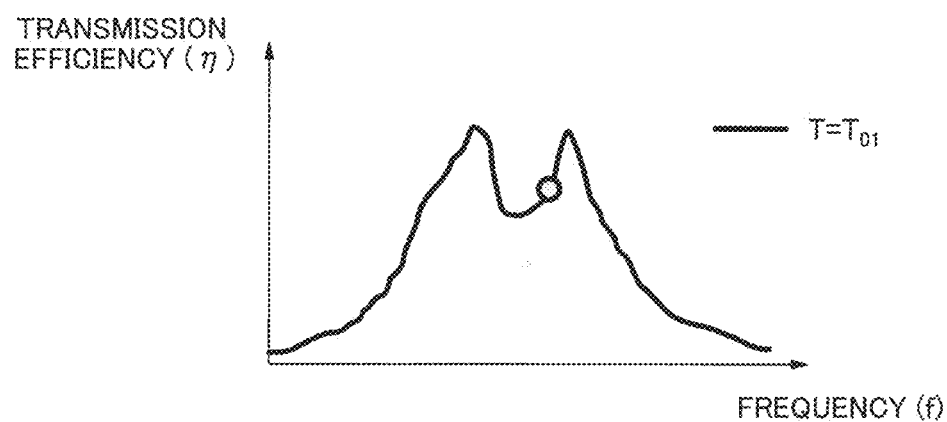
FIG. 3A is a graph illustrating transmission efficiency ($\eta$) of wireless power transmission in relation to frequency (f) at the present time point for the purpose of explaining frequency control by a control device of wireless power transmission according to a first exemplary embodiment of the present invention when a temperature change has occurred in the seawater, and the circle in the drawing indicates an operation point at a time $T_{01}$.
Figure 3B:
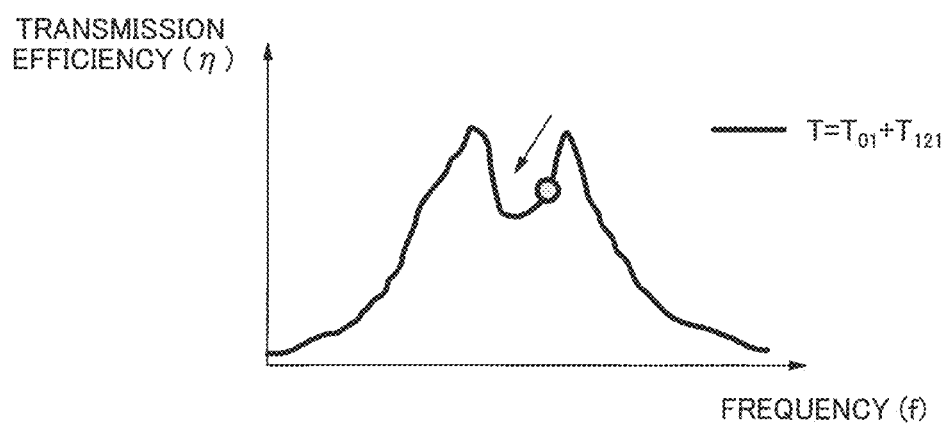
FIG. 3B is a graph illustrating transmission efficiency ($\eta$) of wireless power transmission in relation to frequency (f) at the present time point, and the circle in the drawing indicates an operation point at a time $T_{01}+T_{121}$.
Figure 3C:
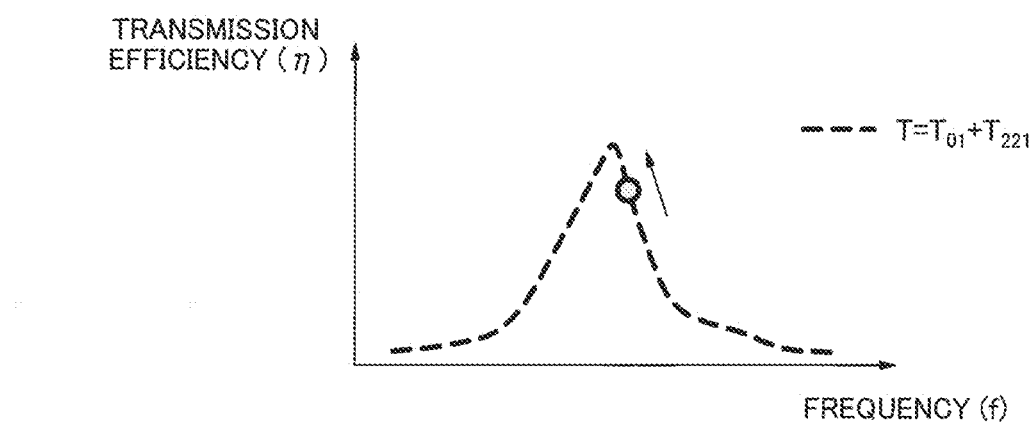
FIG. 3C is a graph illustrating transmission efficiency ($\eta$) (a predicted value) at a time $T_{01}+T_{221}$ of wireless power transmission in relation to frequency (f), and the circle in the drawing indicates an operation point at a time $T_{01}+T_{221}$.

In FIG. 3A, a movable body is controlled for predetermined power transmission efficiency and frequency at the time $T_{01}$. The data collection unit 12 then starts collecting temperature data and the data prediction unit 13 starts estimating future temperature change. As described above, for the estimation of temperature changes, it is possible to use various methods such as an extrapolation method and a method using Fourier transform. A frequency control direction corresponding to the estimated future temperature change is determined (FIG. 3B). Control is determined in a direction in which the frequency is decreased. Since the determination is made as described above, control is performed such that the transmission efficiency decreases at the present time point as illustrated in FIG. 3B, but the control is performed such that the transmission efficiency increases with respect to the estimated future temperature change as illustrated in FIG. 3C. On the other hand, in the case of a frequency control that feeds back temperature changes in order to perform control as with the related art, determination is made on the basis of the transmission characteristics at the time $T_{01}$, and in this case in a direction in which the frequency is increased. Therefore, with the related art, it is probable that control is performed to decrease transmission efficiency.

By the time $T_{01}+T_{121}$, the data prediction unit 13 determines control parameters corresponding to the estimated future temperature change. At the time $T_{01}+T_{221}$, the parameter control unit 14 starts the control of the movable body control unit 15 and the antenna control unit 16 (FIG. 3C). At this point, the estimated temperature change actually occurs and the power transmission characteristics shift from the solid line to the broken line of FIG. 2. Although the power transmission characteristics have changed, since the control parameters had been determined so as to allow for this change, the power transmission efficiency is improved.

Figure 3D:
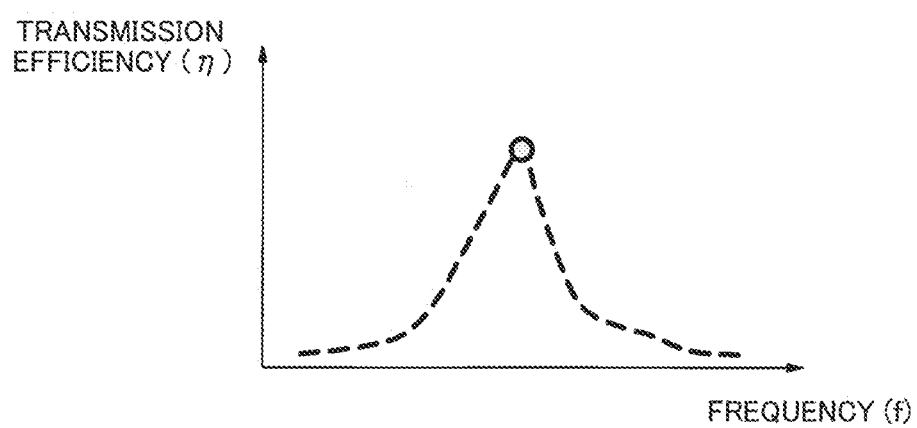
FIG. 3D is a graph illustrating transmission efficiency ($\eta$) (a predicted value) at a time $T_{01}+T_{331}$ of wireless power transmission in relation to frequency (f), and the circle in the drawing indicates an operation point at a time $T_{01}+T_{331}$.

As described above, the control device 11 of the present exemplary embodiment estimates an optimization direction and adjust the frequency in the direction, which results in an optimal frequency and high transmission efficiency (FIG. 3D) as a final outcome. As described above, even in the case of occurrence of environmental changes, which has been difficult to handle with the related art, it is possible to supply power more stably and more highly efficiently with the control device 11 of the present exemplary embodiment. Conversion of control by the control device 11 of the present exemplary embodiment is compared and illustrated below.

Figure 4A:
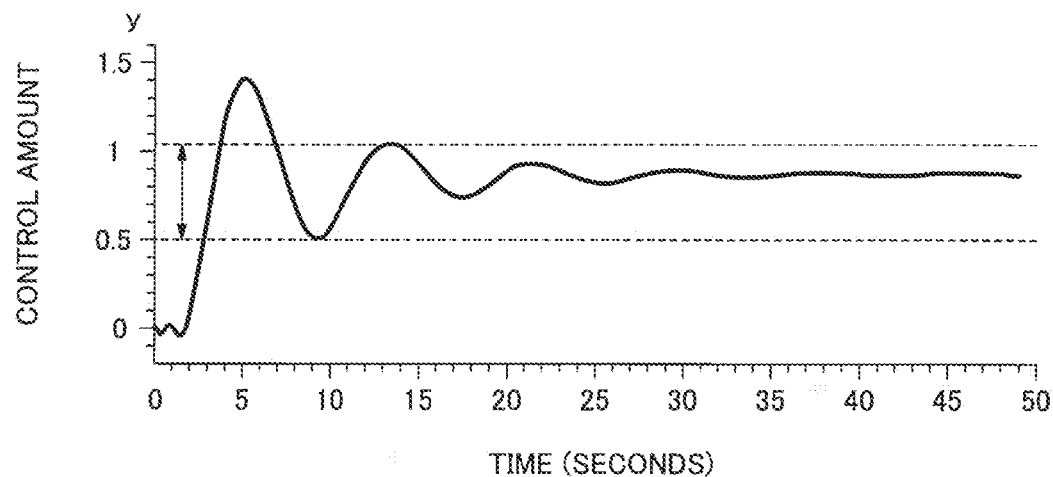
FIG. 4A is a graph illustrating a fluctuation range of control amount when a related art is applied, for the purpose of explaining effects of frequency control when a temperature change occurs in the seawater with respect to wireless power transmission in the seawater.
Figure 4B:
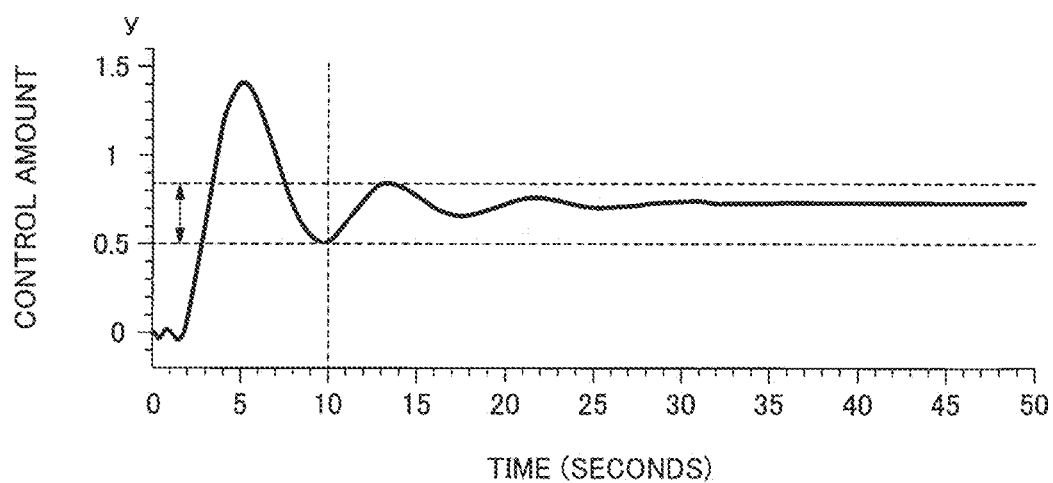
FIG. 4B is a graph illustrating a fluctuation range of control amount when a technology of the present exemplary embodiment is applied, for the purpose of explaining effects of frequency control when a temperature change occurs in the seawater with respect to wireless power transmission in the seawater.

FIG. 4A is a graph illustrating a fluctuation range of a control amount when applying the related art for the purpose of explaining the effects of frequency control when a temperature change has occurred in the seawater with respect to wireless power transmission in the seawater. FIG. 4B is a graph illustrating a fluctuation range of a control amount when applying the technology of the present exemplary embodiment for the purpose of explaining the effects of frequency control when a temperature change has occurred in the seawater with respect to wireless power transmission in the seawater. In other words, FIG. 4A and FIG. 4B are diagrams illustrating a comparison between the control amount when control based on a predicted future environmental change is not performed (FIG. 4A) and the control amount when control based on the predicted future environmental change is performed (FIG. 4B). It is assumed that a target control amount (a load and the like) changes at the time point of two seconds, resulting in an occurrence of a change. The case in which the change has been compensated for relying on a predetermined control function is illustrated in FIG. 4A and the case in which the change has been compensated for by rewriting a control function at the time point of 10 seconds on the basis of the predicted future environmental change according to the present exemplary embodiment is illustrated in FIG. 4B. Then, it can be understood that in the case of FIG. 4B, the fluctuation range of the control amount is smaller as compared with the case of FIG. 4A. Thus, the predictive control enables a stable control with smaller fluctuation of the control amount.

As described above, according to the present exemplary embodiment, it is possible to control wireless power transmission by using control parameters corresponding to a predicted future environmental change. As a consequence, an advantageous effect of stably supplying power is obtained even in an aerial, underwater, or other environment in which environmental changes continuously occur.

Second Exemplary Embodiment

Figure 5:
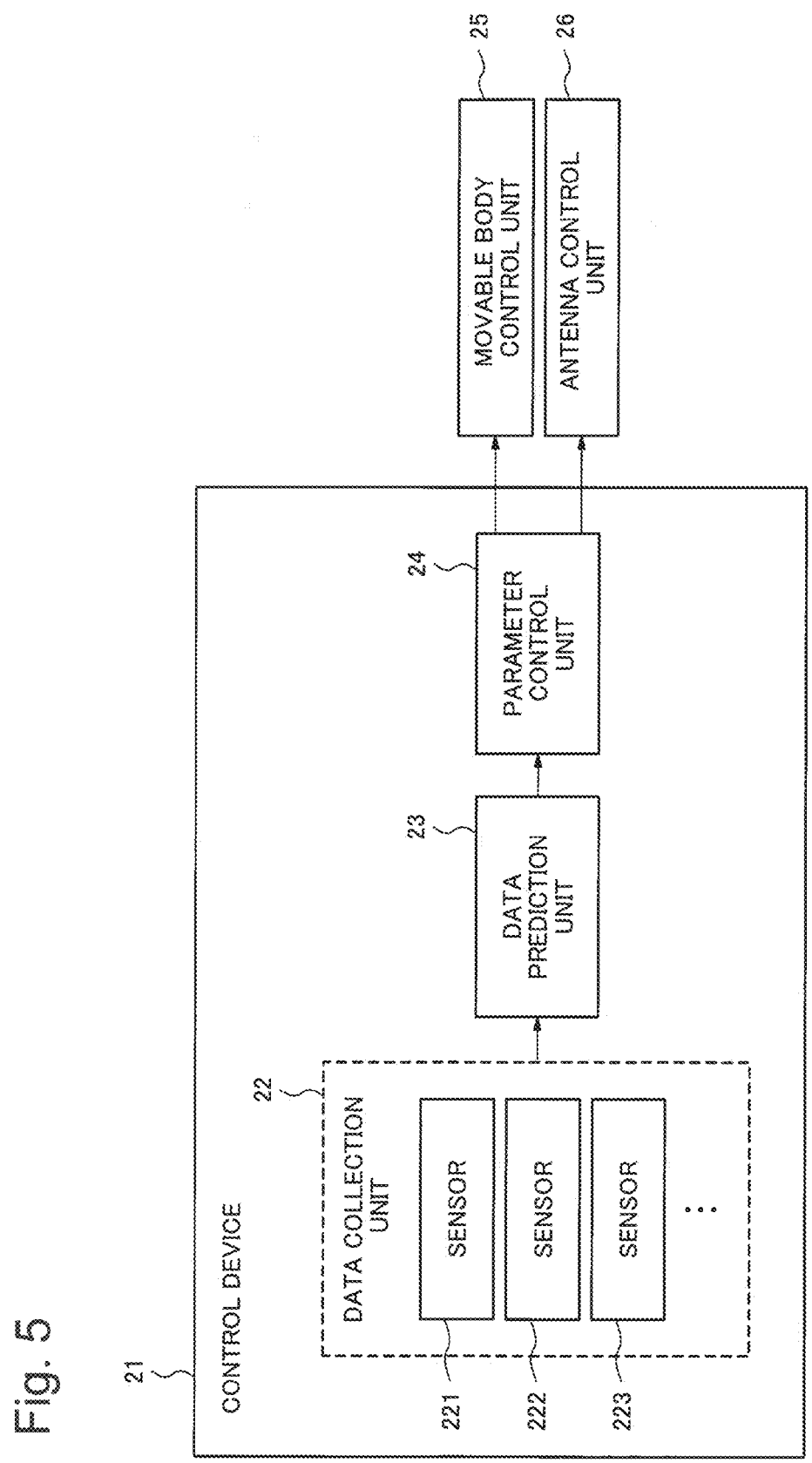
FIG. 5 is a block diagram illustrating a configuration of a control device of wireless power transmission according to a second exemplary embodiment of the present invention.

FIG. 2 is a block diagram illustrating a configuration of a control device 21 of wireless power transmission according to a second exemplary embodiment of the present invention. The difference between the configuration of the control device 11 illustrated in FIG. 1 and the configuration of the control device 21 illustrated in FIG. 5 lies in a data collection unit 22. That is, the data collection unit 22 of the present exemplary embodiment is composed of a plurality of sensors including a sensor 221, a sensor 222, a sensor 223 and the like. In particular, for example, the sensor 221 and the sensor 222 are composed of a temperature sensor and the sensor 223 is composed of a flow rate sensor. The configuration of the control device 21 is otherwise the same as in the first exemplary embodiment. It should be noted that, the configuration of the data collection unit 22 will be described, for example, assuming the use of a temperature sensor and a flow rate sensor; however, the types of the sensors are not limited thereto. Various types of sensors may be used including a pressure sensor, a gyro sensor, a speedometer, a camera, and an acoustic sensor as well as any device which serves as a sensor.

Next, the operation of the control device 21 in the present exemplary embodiment will be sequentially described. Similarly to the first exemplary embodiment, described will be the operation of the control device 21 for the use in wireless power transmission, as an example, in the seawater, in which temperature changes occur constantly and irregularly; however, the present invention is not limited thereto.

First, the data collection unit 22 measures the external temperature of a movable body 27 and the flow rate of the seawater by using a plurality of different sensors such as a temperature sensor and a flow rate sensor. The condition information so measured is made into data and is transmitted to a data prediction unit 23. Next, the data prediction unit 23 receives the data sent from the data collection unit 22. Next, the data prediction unit 23 estimates a future environmental change by using the received data. Next, the data prediction unit 23 determines control parameters corresponding to the estimated condition of the external environment. The determined control parameters are made into data and are transmitted to a parameter control unit 24. Next, the parameter control unit 24 receives the determined control parameters. On the basis of the control parameters, the parameter control unit 24 controls a movable body control unit 25 and an antenna control unit 26. At this time, the data prediction unit 23 can more accurately estimate the future environmental changes from a correlation of data regarding a plurality of estimated conditions of external environment.

Figure 6:
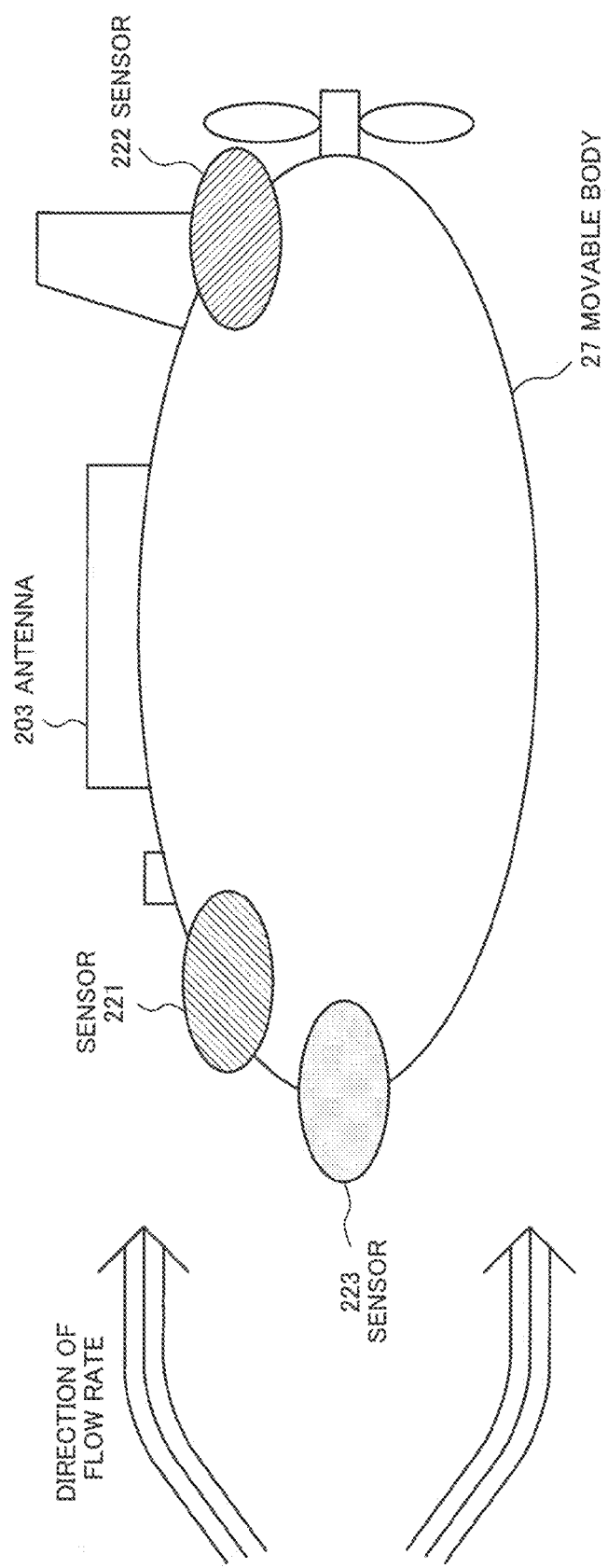
FIG. 6 is a diagram for explaining a control operation in a control device of wireless power transmission according to a second exemplary embodiment of the present invention.

FIG. 6 is a diagram for explaining a control operation in the control device 21 of wireless power transmission according to the present exemplary embodiment. The movable body 27 is equipped with the sensor 221, the sensor 222, the sensor 223, and an antenna 203. Similarly, the data prediction unit 23, the parameter control unit 24, the movable body control unit 25, the antenna control unit 26 and the like are mounted on the movable body 27, but they are not illustrated in the drawing. As described above, the sensor 221 and the sensor 222 are temperature sensors and the sensor 223 is a flow rate sensor. The sensor 221 and the sensor 222 measure temperatures at a certain time, individually. At the same time, the sensor 223 measures a direction and magnitude of a flow rate. Information collected by the sensor 221, the sensor 222, and the sensor 223 are made into data and is transmitted to the data prediction unit 23. The data prediction unit 23 calculates a present temperature distribution of the surrounding environment from the data of the sensor 221 and the sensor 222.

Next, from the data of the sensor 223, that is, from the direction and magnitude of the flow rate, it is possible to predict a change in a temperature distribution around the antenna 203. For example, when the separation distance between the sensor 221 and the antenna 203 is 1 m and the flow rate is 1 m/s, it can be predicted that a temperature distribution around the antenna 103 will become equal in 1 second to a temperature measured by the sensor 221. As described above, by using a plurality of sensors which measure different physical quantities, a present temperature distribution around the movable body and environmental information of a flow rate and the like around the movable body are acquired, and a future temperature distribution (environmental changes) around the movable body is estimated. Control parameters corresponding to the estimated condition of external environment are then determined. The operation after the determination of the control parameters is similar to the operation in the first exemplary embodiment.

Effects

According to the present exemplary embodiment, it is possible to control wireless power transmission by using control parameters corresponding to a predicted future environmental change. As a consequence, an advantageous effect of stably supplying power is obtained even in an aerial, underwater, or other environment in which environmental changes continuously occur.

Moreover, in the present exemplary embodiment, a plurality of data which change over time are acquired and a future environmental change is predicted from a correlation of the plurality of data, so that it is possible to perform future prediction very accurately. As a consequence, even in an environment in which environmental changes continuously occur, it is possible to stably supply power with high accuracy.

In addition, the method according to the above-described first exemplary embodiment, which makes prediction from data of a single sensor, can be used in combination with the present exemplary embodiment, which uses data acquired from a plurality of different sensors. By so doing, the accuracy of data prediction is further improved. Moreover, in the present exemplary embodiment, it is possible to estimate a sudden temperature change caused by a sudden disturbance, which cannot be easily predicted in the first exemplary embodiment. Predicting a sudden change is difficult by a method using an extrapolation and Fourier transform, but in the present exemplary embodiment, a future environmental change can be estimated by using a correlation of data acquired from a plurality of different sensors, so that it is also possible to cope with the sudden change. More specifically, even when there is a sudden temperature increase, that is, a sudden disturbance, it is possible to estimate a time at which a sudden temperature increase is expected to occur around the power receiving antenna on the basis of the measurement of a flow rate around the movable body using the sensor 223 and the detection of a temperature increase using the sensor 221. As described above, an advantageous effect of improved accuracy and application range of data prediction is obtained.

Third Exemplary Embodiment

Figure 7:
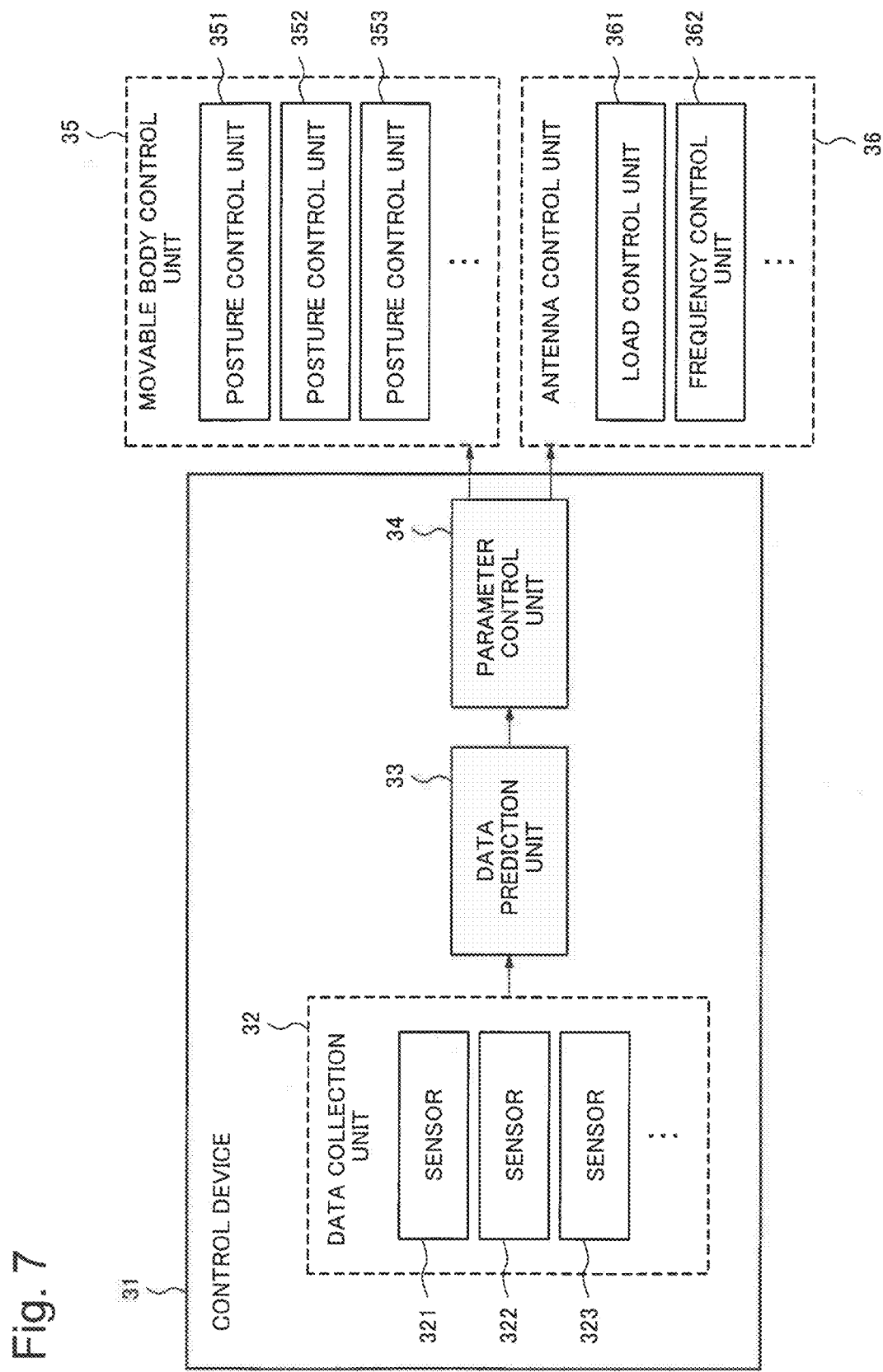
FIG. 7 is a block diagram illustrating a configuration of a control device of wireless power transmission according to a third exemplary embodiment of the present invention.

FIG. 7 is a block diagram illustrating a configuration of a control device 31 of wireless power transmission according to a third exemplary embodiment of the present invention. The difference between the configuration of the control device 21 according to the second exemplary embodiment illustrated in FIG. 5 and the configuration of the control device 31 illustrated in FIG. 7 lies in including a movable body control unit 35 and an antenna control unit 36. The movable body control unit 35 is composed of a plurality of control units including a posture control unit 351, a posture control unit 352, a posture control unit 353 and the like. More specifically, the posture control unit 351 includes a mechanism for controlling a posture relative to an X axis of a movable body, the posture control unit 352 includes a mechanism for controlling a posture relative to a Y axis of the movable body, and the posture control unit 353 includes a mechanism for controlling a posture relative to a Z axis of the movable body. Furthermore, the antenna control unit 36 is composed of a plurality of control units including a load control unit 361, a frequency control unit 362 and the like. More specifically, the control unit 361 includes a mechanism for controlling an optimal load of an antenna, and the frequency control unit 362 includes a mechanism for controlling an optimal frequency of the antenna. The configuration of the control device 31 is otherwise the same as in the second exemplary embodiment. It should be noted that, although control parameters will be described taking as an example a parameter control unit 34 controlling the postures relative to the X, Y, and Z axes of the movable body and the optimal load and frequency of the antenna, the types of the control parameters are not limited thereto. Different control parameters may also be controlled.

Next, the operation of the control device 31 in the present exemplary embodiment will be sequentially described. First, a data collection unit 32 measures the condition of a position, posture and the like of the movable body and the condition of an external environment of the movable body by using one sensor or a plurality of sensors. The condition information on the external environment so measured is made into data and is transmitted to a data prediction unit 33. Next, the data prediction unit 33 receives the data sent from the data collection unit 32. Next, the data prediction unit 33 estimates a future environmental change by using the received data. Next, the data prediction unit 33 determines control parameters corresponding to the estimated condition of the external environment. The determined control parameters are made into data and are transmitted to the parameter control unit 34. Next, the parameter control unit 34 receives the determined control parameters. The parameter control unit 34 controls the movable body control unit 35 and the antenna control unit 36 on the basis of the control parameters. The movable body control unit 35 performs control by selecting one or more from a plurality of posture control units including the posture control unit 351, the posture control unit 352, the posture control unit 353 and the like. The antenna control unit 36 performs control by selecting one or more from a plurality of posture control units including the load control unit 361, the frequency control unit 362 and the like.

At this point, on the basis of the estimated future environmental change, the data prediction unit 33 selects a predetermined control parameter from a plurality of control parameters including the postures relative to the X, Y, and Z axes of the movable body, the optimal load and frequency of the antenna, and the like. For example, the data prediction unit 33 selects one or more of control parameters which enhance power transmission efficiency and transfers the control parameters and a control amount to the parameter control unit 34.

More details are as follows. For example, the optimal load of the antenna can be adjusted with an inductance L and a capacitance C of a matching circuit connected to the antenna. Furthermore, the optimal frequency of the antenna can be controlled with a control voltage value V_VCO of VCO (Voltage-Controlled Oscillator) that controls a frequency of power inputted to the antenna. The data prediction unit 33 calculates power transmission efficiency to be obtained by performing control using any one or more of the control parameters of L, C, and V_VCO. Then, the data prediction unit 33 determines a control parameter with which the optimal power transmission efficiency is to be obtained. In addition, as will be described later, the optimal frequency and a target value of the power transmission efficiency are fed back from the movable body serving as a power receiving side to a power transmitting side.

Furthermore, the data prediction unit 33 can use various methods in order to determine the above-described control parameters. For example, the data prediction unit 33 may determine an optimal control parameter corresponding to the predicted environmental change on the basis of a data table acquired in advance. The data prediction unit 33 may also ascertain the present situation on the basis of measurement results at a plurality of different frequencies, calculate a result for the predicted environmental change by using an equivalent circuit analysis method and the like, and then determine the optimal control parameter corresponding to the predicted environmental change.

Furthermore, the data prediction unit 33 can determine the control parameters by using various methods. The data prediction unit 33 can determine the optimal control parameter by using a full searching method or a hill climbing method, for example. Moreover, the data prediction unit 33 can also use genetic algorithm method. By using the genetic algorithm method, even when there are many control parameters, the data prediction unit 33 can determine control parameters with favorable convergence performance in a short search time.

Effects

According to the control device 31 of the present exemplary embodiment, it is possible to control wireless power transmission by using control parameters corresponding to a predicted future environmental change. As a consequence, an advantageous effect of stably supplying power is obtained even in an aerial, underwater, or other environment in which environmental changes continuously occur.

Moreover, in the present exemplary embodiment, on the basis of the predicted future environmental change, a control parameter that enhances power transmission efficiency is selected from parameters regarding the position of a movable body such as a flight vehicle and an AUV and any one or a plurality of parameters of an optimal frequency and an optimal load of a power receiving antenna mounted on the movable body. As a consequence, even in an aerial, underwater, or other environment in which environmental changes continuously occur, it is possible to stably supply power with high efficiency.

Fourth Exemplary Embodiment

Figure 8:
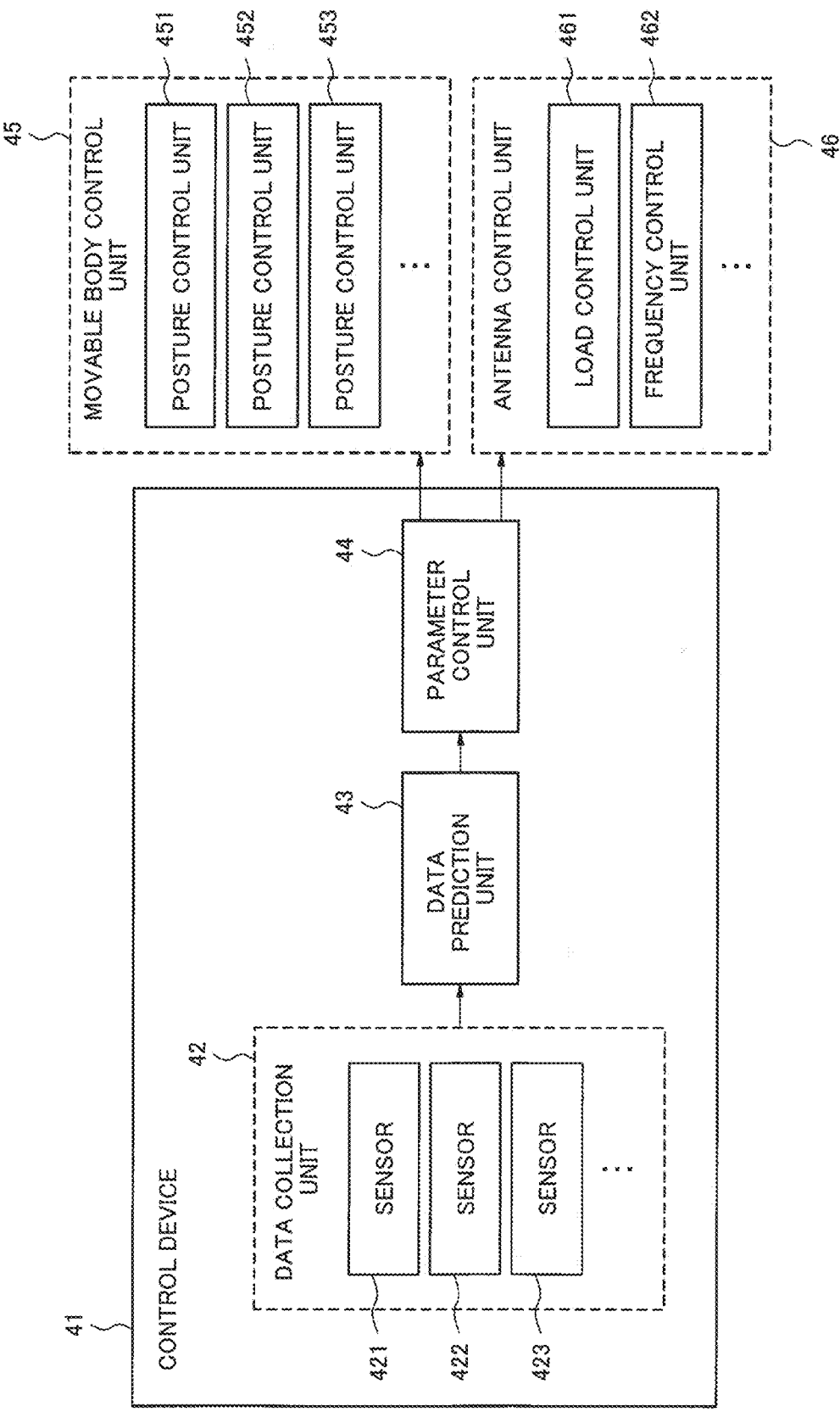
FIG. 8 is a block diagram illustrating a configuration of a control device of wireless power transmission according to a fourth exemplary embodiment of the present invention.

FIG. 8 is a block diagram illustrating a configuration of a control device 41 of wireless power transmission according to a fourth exemplary embodiment of the present invention. The difference between the configuration of the control device 21 according to the second exemplary embodiment illustrated in FIG. 5 and the configuration of the control device 41 illustrated in FIG. 8 lies in a movable body control unit 45 and an antenna control unit 46. The movable body control unit 45 is composed of a plurality of control units including a posture control unit 451, a posture control unit 452, a posture control unit 453 and the like.

More specifically, the posture control unit 451 includes a mechanism for controlling a posture relative to an X axis of a movable body 47, the posture control unit 452 includes a mechanism for controlling a posture relative to a Y axis of the movable body 47, and the posture control unit 453 includes a mechanism for controlling a posture relative to a Z axis of the movable body 47. Furthermore, the antenna control unit 46 is composed of a plurality of control units including a load control unit 461, a frequency control unit 462 and the like. More specifically, the load control unit 461 includes a mechanism for controlling an optimal load of an antenna, and the frequency control unit 462 includes a mechanism for controlling an optimal frequency of the antenna. The configuration of the control device 41 is otherwise the same as in the second exemplary embodiment. It should be noted that, although control parameters will be described taking as an example a parameter control unit 44 controlling the postures relative to the X, Y, and Z axes of the movable body 47 and the optimal load and frequency of the antenna, the types of control parameters are not limited thereto. Different control parameters may also be controlled.

Next, the operation of the control device 41 in the present exemplary embodiment will be sequentially described. First, a data collection unit 42 measures the condition of a position, a posture and the like of the movable body 47 and the condition of an external environment of the movable body 47 by using one sensor or a plurality of sensors. The condition information on the external environment so measured is made into data and is transmitted to a data prediction unit 43. Next, the data prediction unit 43 receives the data sent from the data collection unit 42. Next, the data prediction unit 43 estimates a future environmental change by using the received data. Next, the data prediction unit 43 determines control parameters corresponding to the estimated condition of the external environment. The determined control parameters are made into data and are transmitted to the parameter control unit 44. Next, the parameter control unit 44 receives the determined control parameters. Based on the control parameters, the parameter control unit 44 controls the movable body control unit 45 and the antenna control unit 46. The movable body control unit 45 controls a plurality of posture control units including the posture control unit 451, the posture control unit 452, the posture control unit 453 and the like. The antenna control unit 46 controls a plurality of posture control units including the load control unit 461, the frequency control unit 462 and the like.

At this point, on the basis of the estimated future environmental change, the data prediction unit 43 selects a predetermined control parameter from a plurality of control parameters including the postures relative to the X, Y, and Z axes of the movable body 47, the optimal load and frequency of the antenna, and the like. For example, the data prediction unit 43 selects a control parameter which increases a response speed and enhances power transmission efficiency, and transfers the control parameter and a control amount to the parameter control unit 44. In the difference of the control parameters to be selected lies the difference between the data prediction unit 33 according to the third exemplary embodiment and the data prediction unit 43 according to the present exemplary embodiment.

The operation of the data prediction unit 43 will be described in more detail below. The optimal load of the antenna can be adjusted with L and C of a matching circuit connected to the antenna. Furthermore, the optimal frequency of the antenna can be controlled with a control voltage value V_VCO of VCO that controls a frequency of power inputted to the antenna. The data prediction unit 43 calculates power transmission efficiency to be obtained by using any one or more of L, C, and V_VCO and a required processing time. Then, the data prediction unit 43 determines a control parameter with which the optimal power transmission efficiency and the processing time are obtained.

The data prediction unit 43 can determine the control parameter by using various methods. The data prediction unit 43 can determine the optimal control parameter by using a full searching method or a hill climbing method, for example. Moreover, the data prediction unit 43 can also use genetic algorithm method. In the case of using the genetic algorithm method, even when there are many control parameters, the data prediction unit 43 can determine control parameters with favorable convergence performance in a short search time.

Effects

According to the control device 41 of the present exemplary embodiment, it is possible to control wireless power transmission by using control parameters corresponding to a predicted future environmental change. As a consequence, an advantageous effect of stably supplying power is obtained even in an aerial, underwater, or other environment in which environmental changes continuously occur.

Moreover, on the basis of the predicted future environmental changes, a control parameter, which increases a response speed and enhances power transmission efficiency, is selected from parameters regarding the position of a movable body such as a flight vehicle and an AUV and any one or a plurality of parameters of an optimal frequency and an optimal load of a power receiving antenna mounted on the movable body. As a consequence, an advantageous effect is obtained such that power is supplied stably at a high speed and with a high efficiency even in an aerial, underwater, or other environment in which environmental changes continuously occur.

Fifth Exemplary Embodiment

Figure 9:
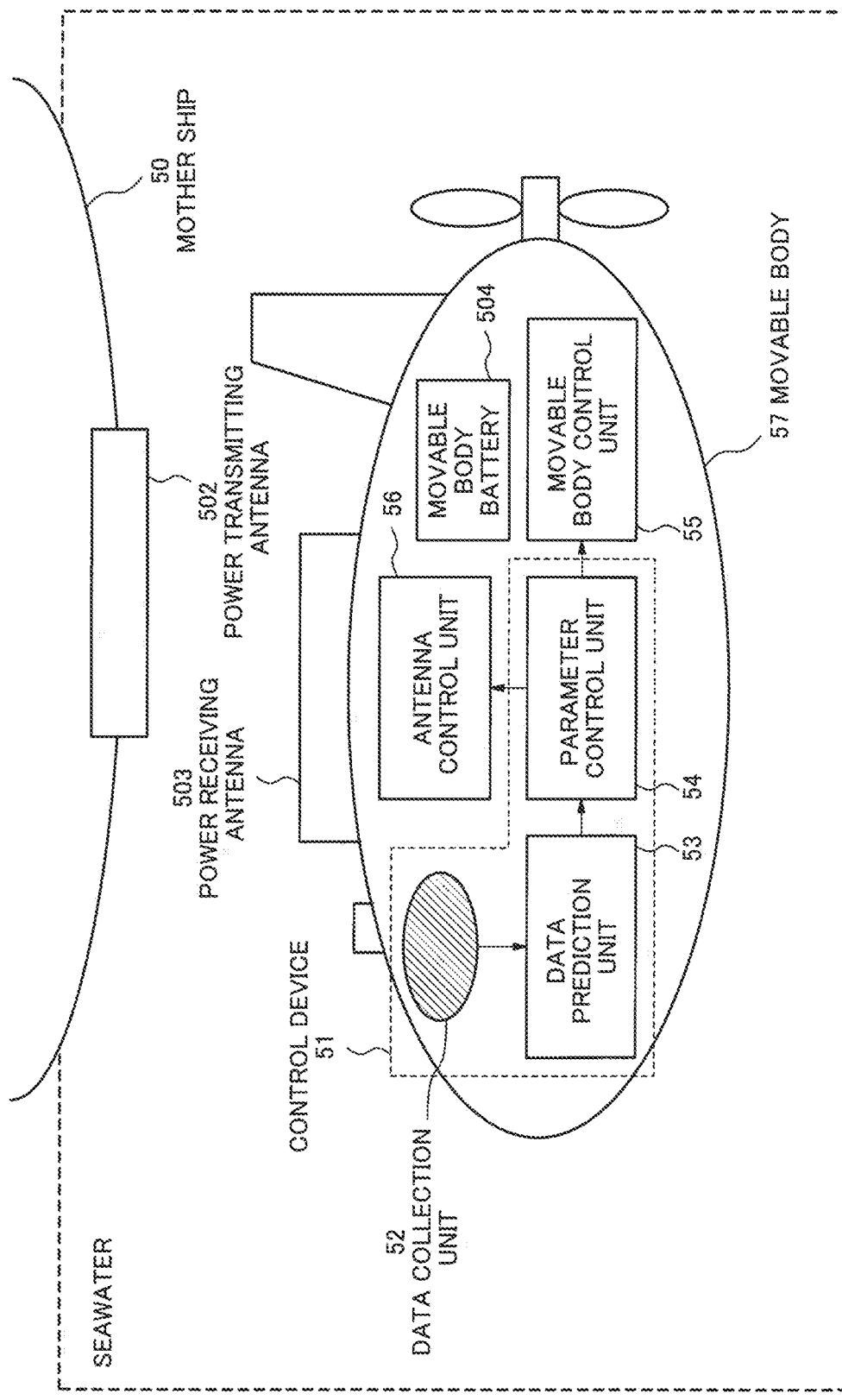
FIG. 9 is a schematic diagram illustrating a configuration of a wireless power transmission system according to a fifth exemplary embodiment of the present invention.
Figure 10:
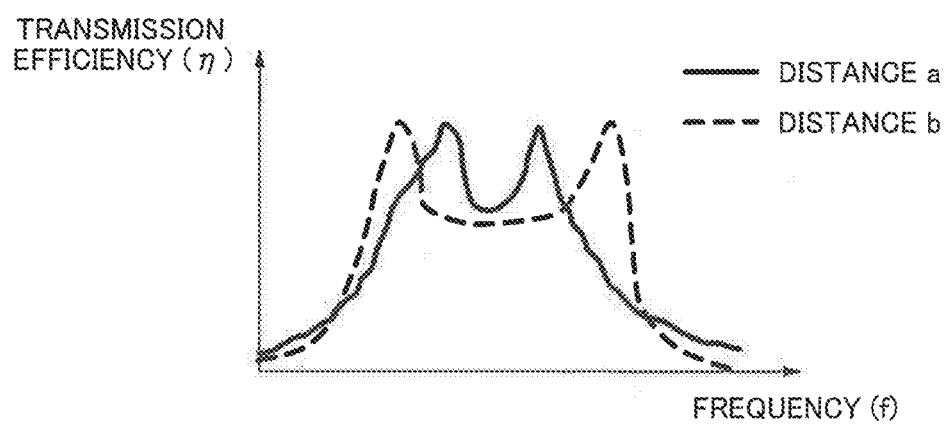
FIG. 10 is a conceptual diagram illustrating characteristics of power transmission for cases in which distances between a power transmitting antenna and a power receiving antenna using a resonance system are varied.
Figure 11:
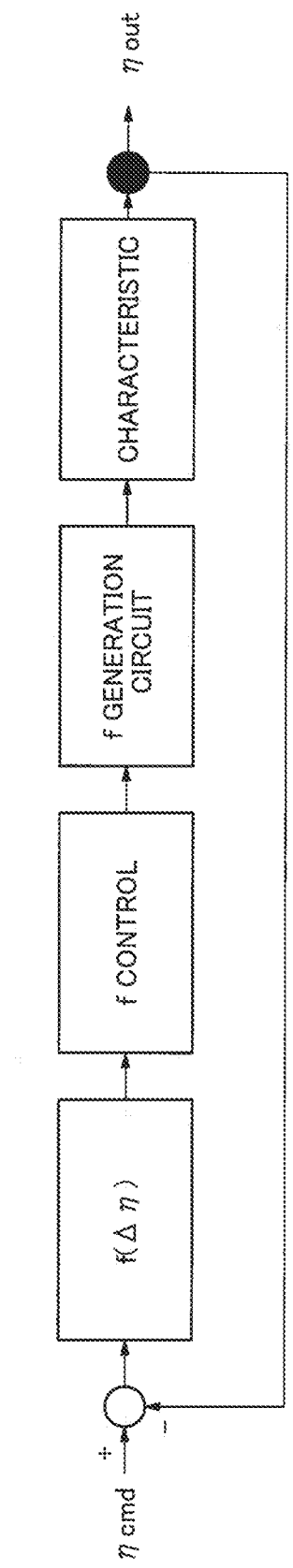
FIG. 11 is a block diagram for explaining the concept of frequency control of wireless power transmission according to a related art.
Figure 12A:
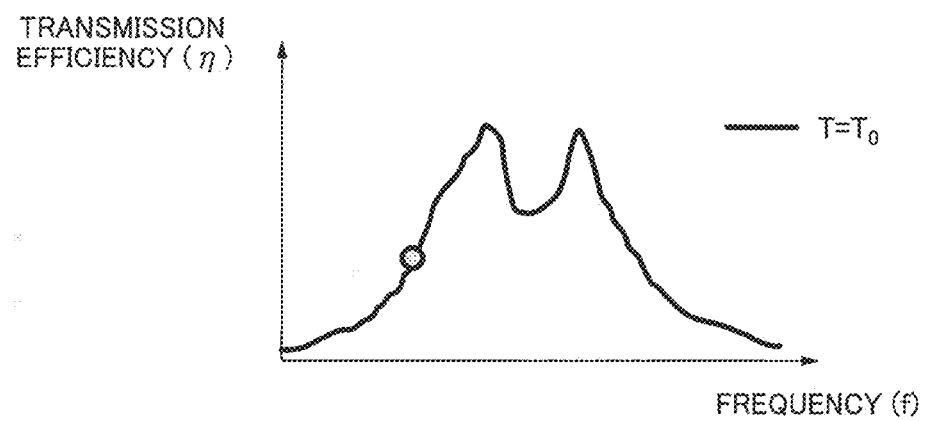
FIG. 12A is a graph illustrating transmission efficiency ($\eta$) of wireless power transmission in relation to frequency (f) for the purpose of explaining a related art for optimally controlling frequency characteristics of wireless power transmission, and the circle in the drawing indicates an operation point at a time $T_0$.
Figure 12B:
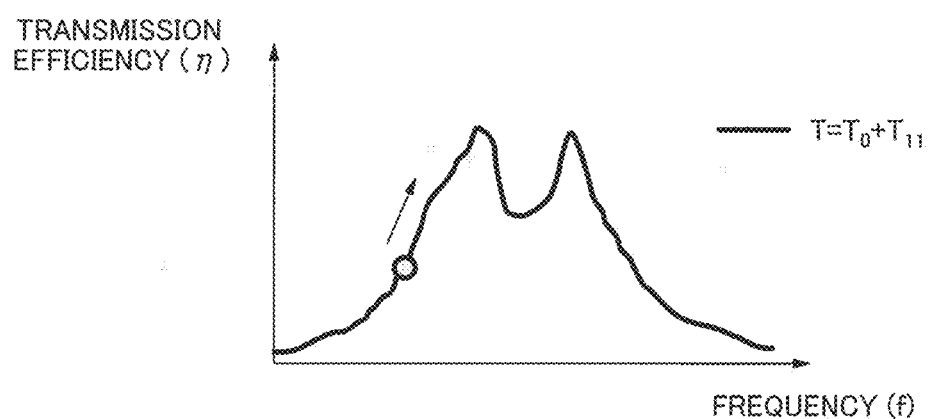
FIG. 12B is a graph illustrating transmission efficiency ($\eta$) of wireless power transmission in relation to frequency (f) and the circle in the drawing indicates an operation point at a time $T_0+T_{11}$.
Figure 12C:
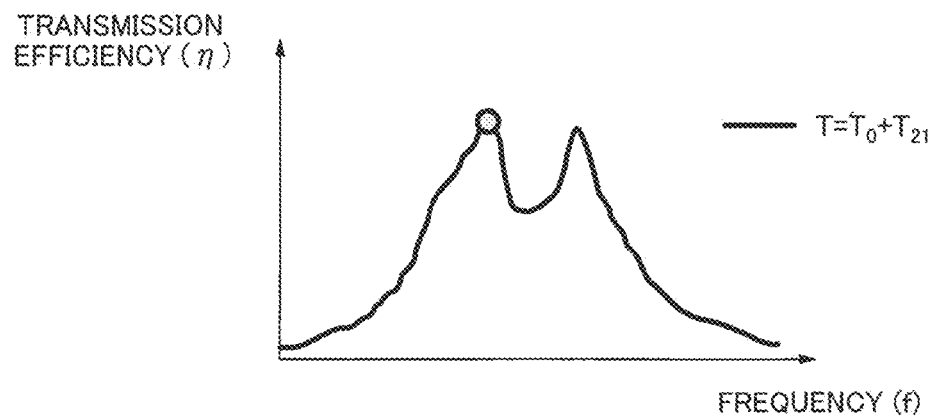
FIG. 12C is a graph illustrating transmission efficiency ($\eta$) of wireless power transmission in relation to frequency (f) and the circle in the drawing indicates an operation point at a time $T_0+T_{21}$.
Figure 13:
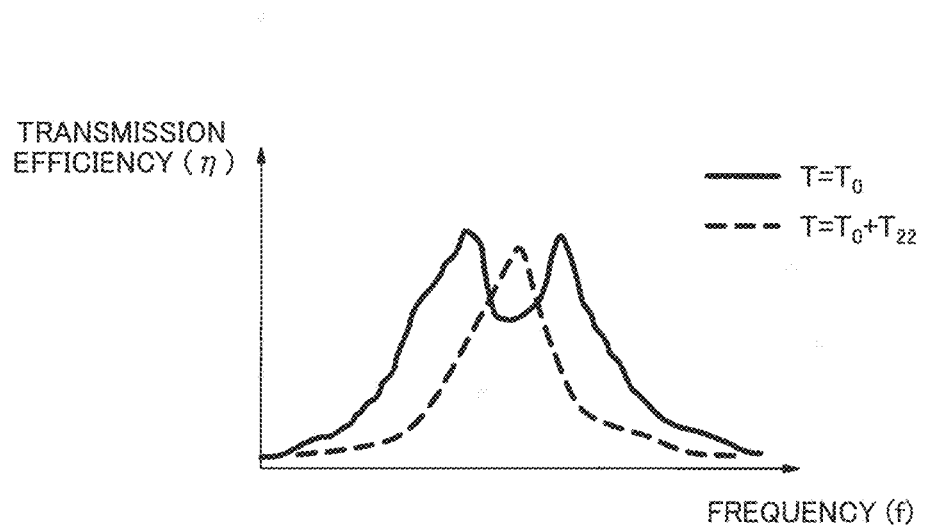
FIG. 13 is a block diagram for explaining a change in transmission characteristics when an environmental change occurs constantly and irregularly in a wireless power transmission system.
Figure 14A:
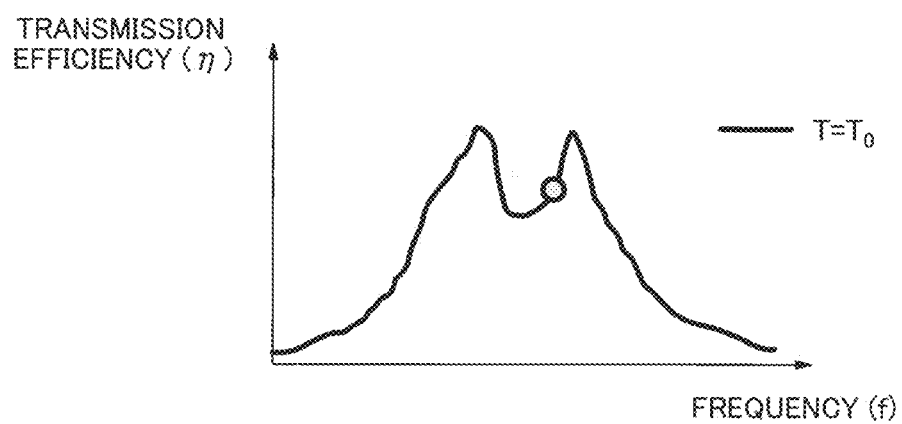
FIG. 14A is a graph illustrating transmission efficiency ($\eta$) of wireless power transmission in relation to frequency (f) at the present time point for the purpose of explaining frequency control according to a related art when an environmental change occurs in wireless power transmission and, the circle in the drawing indicates an operation point at a time $T_0$.
Figure 14B:
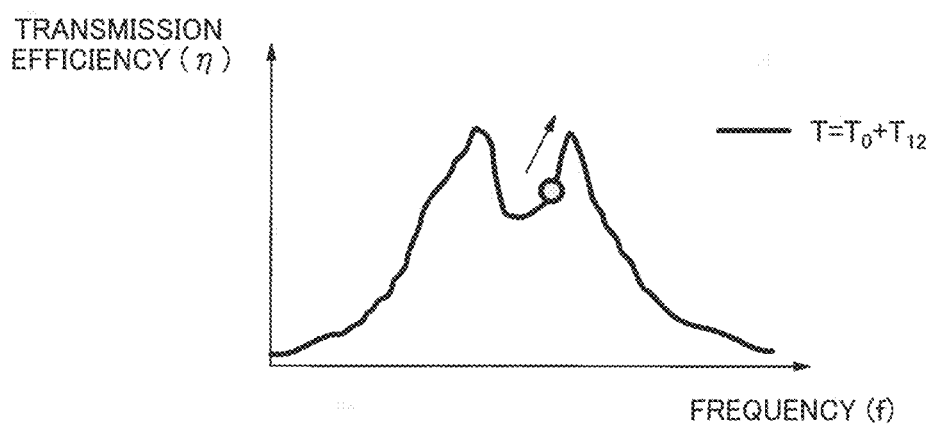
FIG. 14B is a graph illustrating transmission efficiency (η) of wireless power transmission in relation to frequency (f) at the present time point, and the circle in the drawing indicates an operation point at a time $T_0+T_{12}$.
Figure 14C:
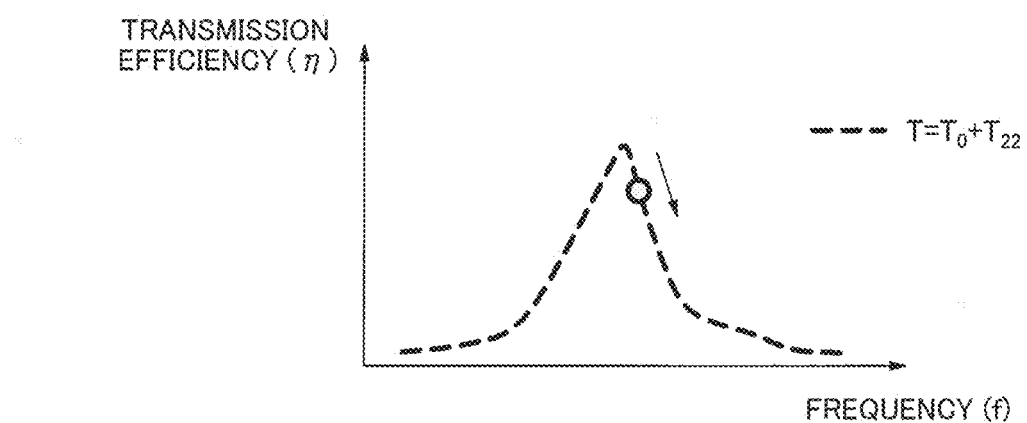
FIG. 14C is a graph illustrating transmission efficiency (η) (a predicted value) at a time $T_0+T_{12}$ of wireless power transmission in relation to frequency (f), and the circle in the drawing indicates an operation point at a time $T_0+T_{22}$.
Figure 14D:
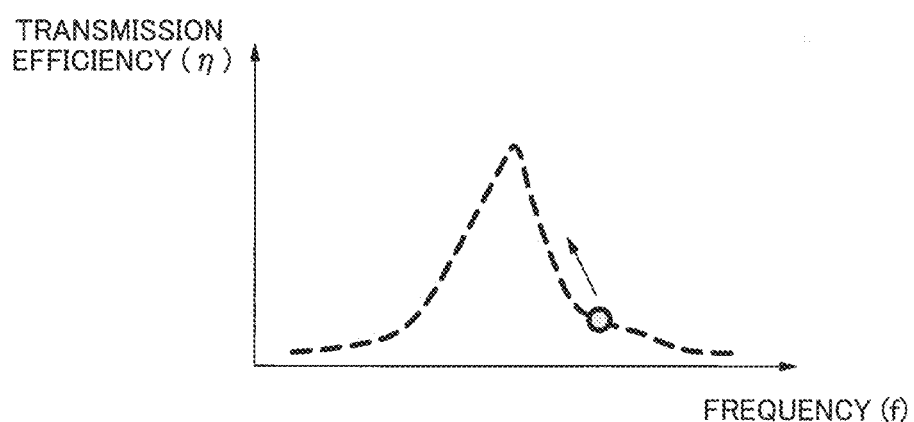
FIG. 14D is a graph illustrating transmission efficiency (η) (a predicted value) when wireless power transmission in relation to frequency (f) should be determined anew, and the circle in the drawing indicates an operation point in a control direction that should be selected when determined anew.

FIG. 9 is a schematic diagram illustrating a configuration of a wireless power transmission system according to a fifth exemplary embodiment of the present invention. Firstly, the configuration of the present exemplary embodiment will be described. A movable body 57 serving as an underwater vehicle operates in the seawater and includes a control device 51, a power receiving antenna 503, and a movable body battery 504. A mother ship 50 floats on the sea surface and includes at least a power transmitting antenna 502. Each element will be described below.

The control device 51 includes a data collection unit 52, a data prediction unit 53, and a parameter control unit 54. Here, a gyro sensor is used for the data collection unit 52. The data prediction unit 53 and the parameter control unit 54 may be a processor installed with a program for performing prediction of a future environmental change and control of the movable body and the power receiving antenna 503 provided to the movable body. A movable body control unit 55 is a motor for adjusting the position and the posture of the underwater vehicle. The antenna control unit 56 is a motor for adjusting the posture of the power receiving antenna 503.

The movable body battery 504 is a lithium ion secondary battery or the like. Furthermore, the movable body battery 504 is connected to the control device 51, the movable body control unit 55, and the antenna control unit 56 and is used in order to drive these elements. In addition, the movable body 57 serving as an underwater vehicle includes various electronic apparatuses (not illustrated) for exploring a submarine topography.

Next, an operation of the control device 51 in the present exemplary embodiment and an operation of the wireless power transmission system realized by an operation of the mother ship 50 including the power transmitting antenna will be described. In the present exemplary embodiment, an environmental change is assumed to be a change of the position of the movable body 57 due to tidal current, buoyancy and the like generated in the seawater. In addition, it is assumed that, since the mother ship 50 is a large ship, it rarely moves and its positional change on the sea does not occur. Therefore, for a positional change between the power transmitting and receiving antennas, it is sufficient to consider a positional change of the movable body 57. There will be described below the operation of the control device 51 for compensating for a change which occurs when the position of the movable body changes as described above, as well as stable wireless power transmission realized by the operation of the control device 51.

First, the movable body 57 approaches the mother ship 50, and wireless power transmission from the power transmitting antenna 502 to the power receiving antenna 503 is started. Simultaneously with the start of the power transmission, the start signal as well as information on a frequency, output and the like used for the wireless power transmission are transferred from the mother ship 50 to the control device 51 by a subsea acoustic communication system (not illustrated). Next, the gyro sensor serving as the data collection unit 52 acquires the motion information of the movable body 57. Next, this motion information is transmitted to the data prediction unit 53. Next, on the basis of the motion information and present location information of the movable body 57, the data prediction unit 53 estimates future motion information. In addition, the present location of the movable body 57 can be accurately determined on the basis of the positioning information at the time of landing on the water and acceleration or speed information collected by the gyro sensor and the like.

Herein, the data prediction unit 53 uses a method such as frequency analysis and the like by an extrapolation or Fourier transform in order to estimate the future motions information. Next, on the basis of the estimated future motions information and the information transmitted from the mother ship 50, control parameters, that is, torque and the like of a motor for adjusting a tuning angle of the power receiving antenna and the position of the underwater vehicle are determined. Next, these control parameters are transmitted to the parameter control unit 54. Next, on the basis of the control parameters estimated by the data prediction unit 53, the parameter control unit 54 controls one or both of the movable body control unit 55 and the antenna control unit 56. In this way, the positions and the directions of the movable body 57 and the power receiving antenna 503 corresponding to the future motions information is adjusted. Furthermore, these series of operations are repeated while updating present information.

Furthermore, on the basis of the estimated future motion information and the information transmitted from the mother ship 50, the data prediction unit 53 estimates a future optimal frequency and a target value of power transmission efficiency. Then, transmission information including the optimal frequency and the target value of the power transmission efficiency is transferred from the control device 51 to the mother ship 50 by the subsea acoustic communication system (not illustrated). In the mother ship 50, control of a frequency and transmission efficiency of power outputted from the power transmitting antenna 502 is performed such that the transferred target value is acquired. Thereafter, transmission information including actual values of the frequency, the output and the like used for the wireless power transmission is transferred from the mother ship 50 to the control device 51. The data prediction unit 53 then uses the transferred actual values as initial information when estimating the future optimal target value. As described above, the target value and the actual value are transferred alternately, so that this series of operations is repeated in the wireless power transmission system.

Effects

Even in an environment in which the motions of the movable body 57 occurs constantly and irregularly in the seawater, it is possible to predict the motions of the movable body 57 and perform wireless power transmission through the aforementioned operations. As a consequence, it is possible to stably perform wireless power transmission from the mother ship 50 to the movable body 57 in the seawater. According to the wireless power transmission system of the present exemplary embodiment, it is possible to control wireless power transmission by using the control parameters corresponding to the future environmental change estimated by the control device 51, so that charging efficiency to the movable body 57 is improved. As a consequence, an advantageous effect of shortening the time for battery charging and of improving the efficiency of submarine topographical survey is obtained.

Modification of Fifth Exemplary Embodiment

Figure 15:
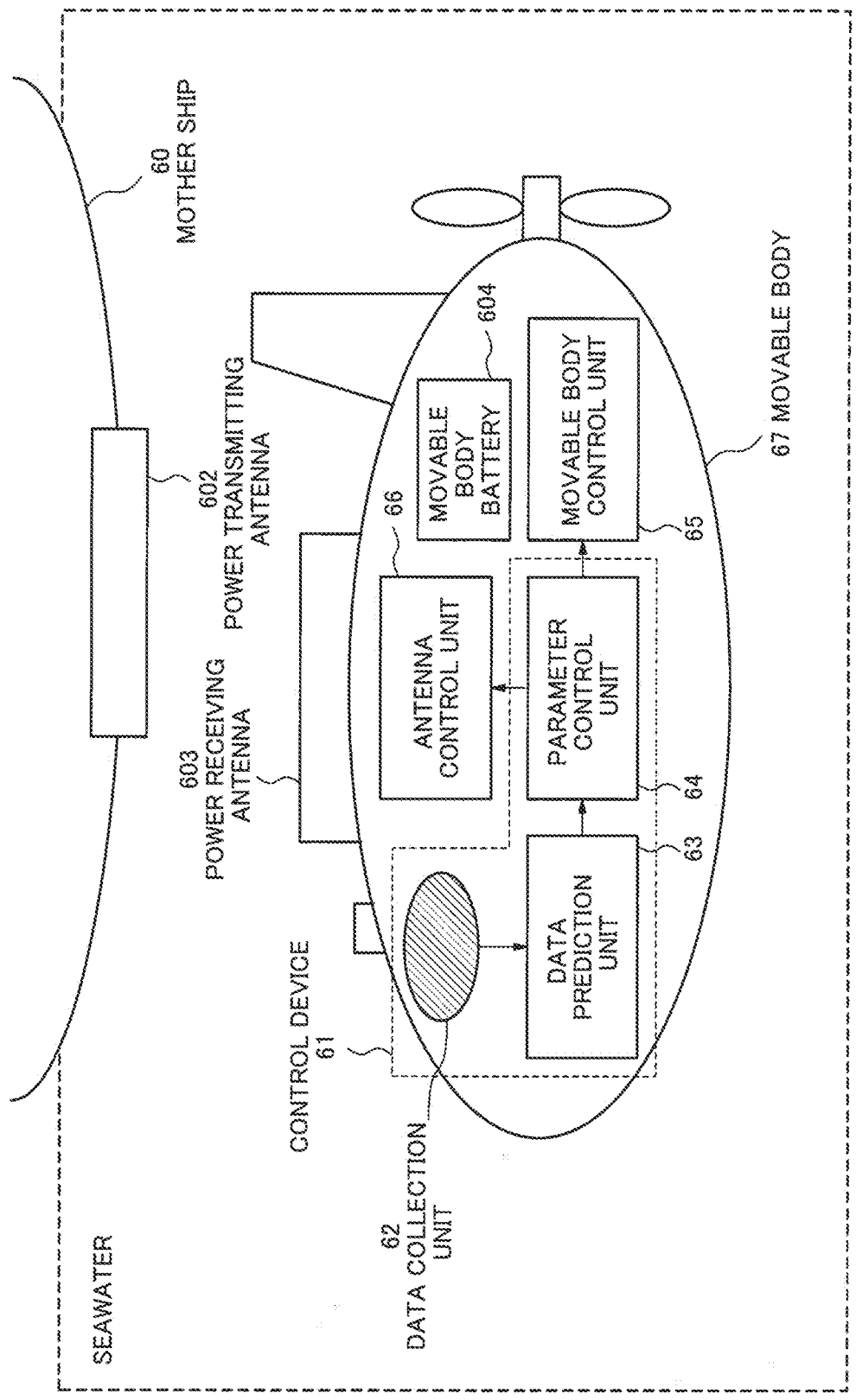
FIG. 15 is a schematic diagram illustrating a configuration of a wireless power transmission system according to a modification of a fifth exemplary embodiment of the present invention.

Next, referring to FIG. 15 to FIG. 18, a modification of the fifth exemplary embodiment will be described. FIG. 15 is a schematic diagram illustrating a configuration of a wireless power transmission system according to the present modification. Since the wireless power transmission system of the present modification has the same configuration as that of the wireless power transmission system in the above-described fifth exemplary embodiment, a description thereof will be omitted.

Next, an operation of a control device 61 in the present modification and an operation of the wireless power transmission system realized by an operation of a mother ship 60 including a power transmitting antenna will be described. In the present exemplary embodiment, an environmental change is assumed to be a change of the position of a movable body due to tidal current, buoyancy and the like generated in the seawater. In addition, it is assumed that, since the mother ship 60 is a large ship, it rarely moves and its positional change on the sea does not occur. Therefore, for a positional change between power transmitting and receiving antennas, it is sufficient to consider a positional change of a movable body 67. There will be described below the operation of the control device 61 for compensating for a change which occurs when the position of the movable body changes as described above, as well as stable wireless power transmission realized by the operation of the control device 61.

First, the movable body 67 approaches the mother ship 60, and wireless power transmission from a power transmitting antenna 602 to a power receiving antenna 603 is started. Simultaneously with the start of the power transmission, the start signal as well as information on a frequency, output and the like used for the wireless power transmission are transferred from the mother ship 60 to the control device 61 by a subsea acoustic communication system (not illustrated). Next, a gyro sensor serving as a data collection unit 62 acquires the motion information of the movable body 67. Next, this motion information is transmitted to a data prediction unit 63. Next, based on the motion information of the movable body 67 and present location information, the data prediction unit 63 estimates future motion information. The data prediction unit 63 uses a method such as frequency analysis by an extrapolation or Fourier transform or the like in order to estimate the future motion information. Herein, the motion information predicted by the aforementioned data prediction unit 63 is a function of a time and is expressed by the following Formula (1).

$$x=f(t) \quad \text{Formula (1)}$$

That is, the data prediction unit 63 estimates the future motion information and creates a prediction function expressed by the Formula (1) above. It should be noted that, although in the present example x is described as a relative distance between a power transmitting antenna and a power receiving antenna, x is not limited thereto and may indicate various parameters such as conductivity and a dielectric constant of a medium.

Next, the data prediction unit 63 substitutes the aforementioned created prediction function x=f(t) in a prediction control function y=g(x) stored in the data prediction unit 63 in advance, and determines control parameters.

Figure 16A:
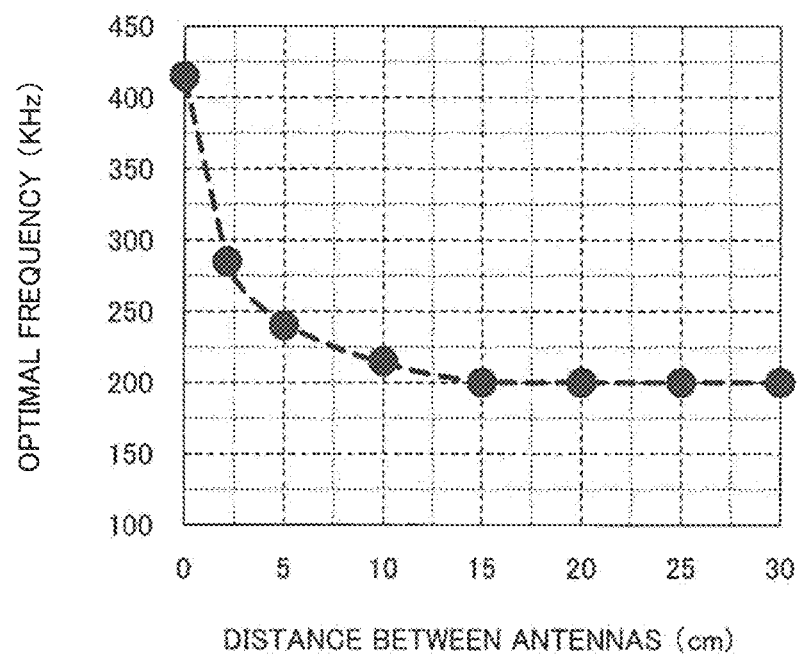
FIG. 16A is a graph illustrating an example of a relation of the distance between a power transmitting antenna and a power receiving antenna, and an optimal frequency.
Figure 16B:
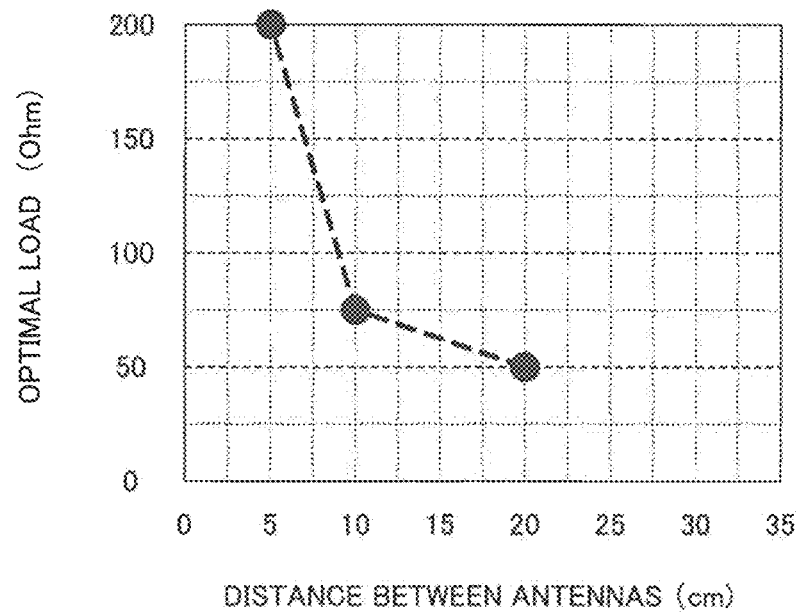
FIG. 16B is a graph illustrating an example of a relation of the distance between a power transmitting antenna and a power receiving antenna, and an optimal load.
Figure 17A:
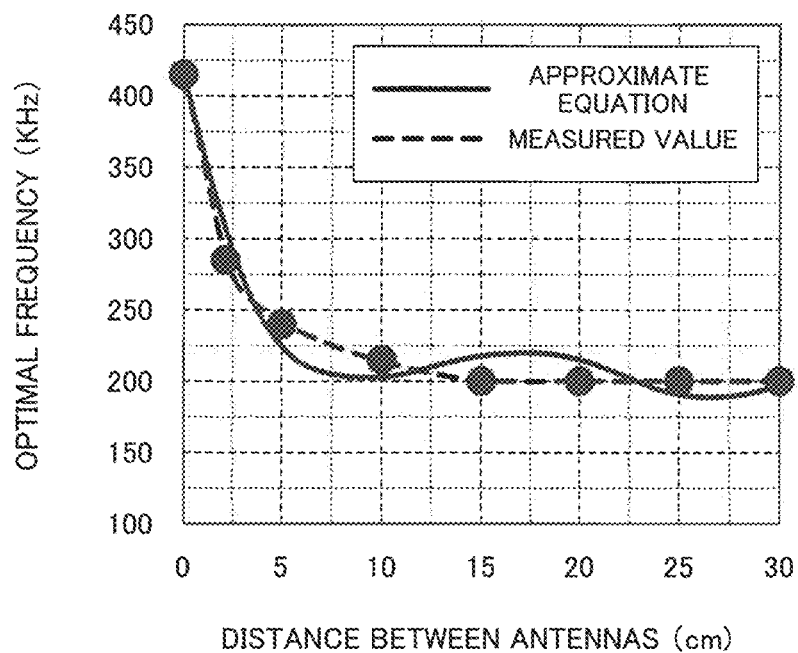
FIG. 17A is a graph illustrating an approximate equation indicating a relation between a separation distance between wireless power supply antennas in the sea, and an optimal frequency.
Figure 17B:
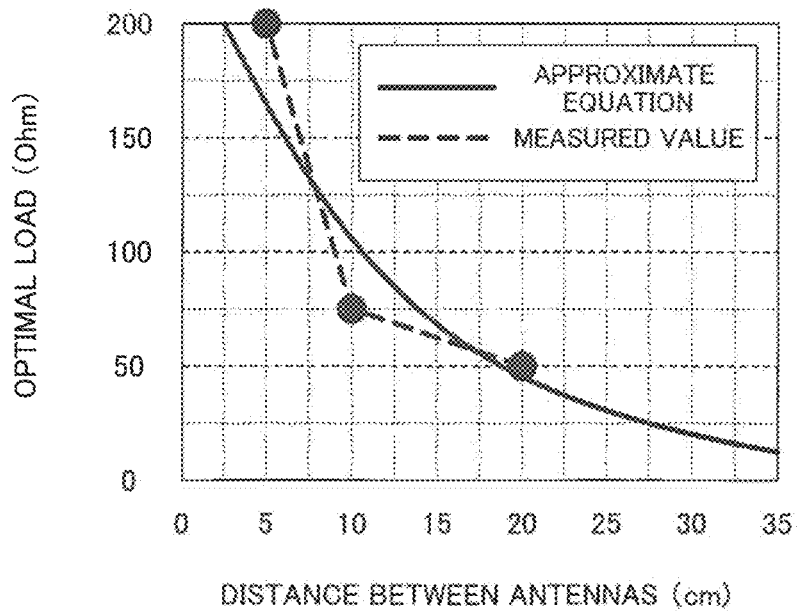
FIG. 17B is a graph illustrating an approximate equation indicating a relation between a separation distance between wireless power supply antennas in the sea, and an optimal load.

Hereinafter, the prediction control function will be described. The prediction control function is a function for deciding a control parameter (frequency or load) on the basis of the prediction function x=f(t). As described above, the motion information x is a function of time and is expressed by x=f(t). The x changes according to time, and a frequency or impedance optimal for power supply differs at each time. FIG. 16A is a graph illustrating an example of a relation between the distance between a power transmitting antenna and a power receiving antenna, and an optimal frequency. Furthermore, FIG. 16B is a graph illustrating an example of a relation between the distance between a power transmitting antenna and a power receiving antenna, and an optimal load. As illustrated in FIG. 16A and FIG. 16B, according to the distance between the power transmitting antenna and the power receiving antenna, the optimal frequency and the optimal load change. Therefore, it is necessary to select an optimal control parameter (frequency or impedance) for x, which changes according to time. FIG. 17A is a graph illustrating an approximate equation indicating a relation between the separation distance between wireless power supply antennas in the sea and an optimal frequency. FIG. 17B is a graph illustrating an approximate equation indicating a relation between the separation distance between wireless power supply antennas in the sea and an optimal load. In these approximate equations, an optimal frequency or a load with respect to x is expressed by y. That is, by using the above-described x=f(t), the control parameter y can be expressed as follows:

$$y=g(x)=g(f(t)) \quad \text{Formula (2)}$$

By using this Formula, it is possible to determine the optimal control parameter y corresponding to the predicted x.

Figure 18:
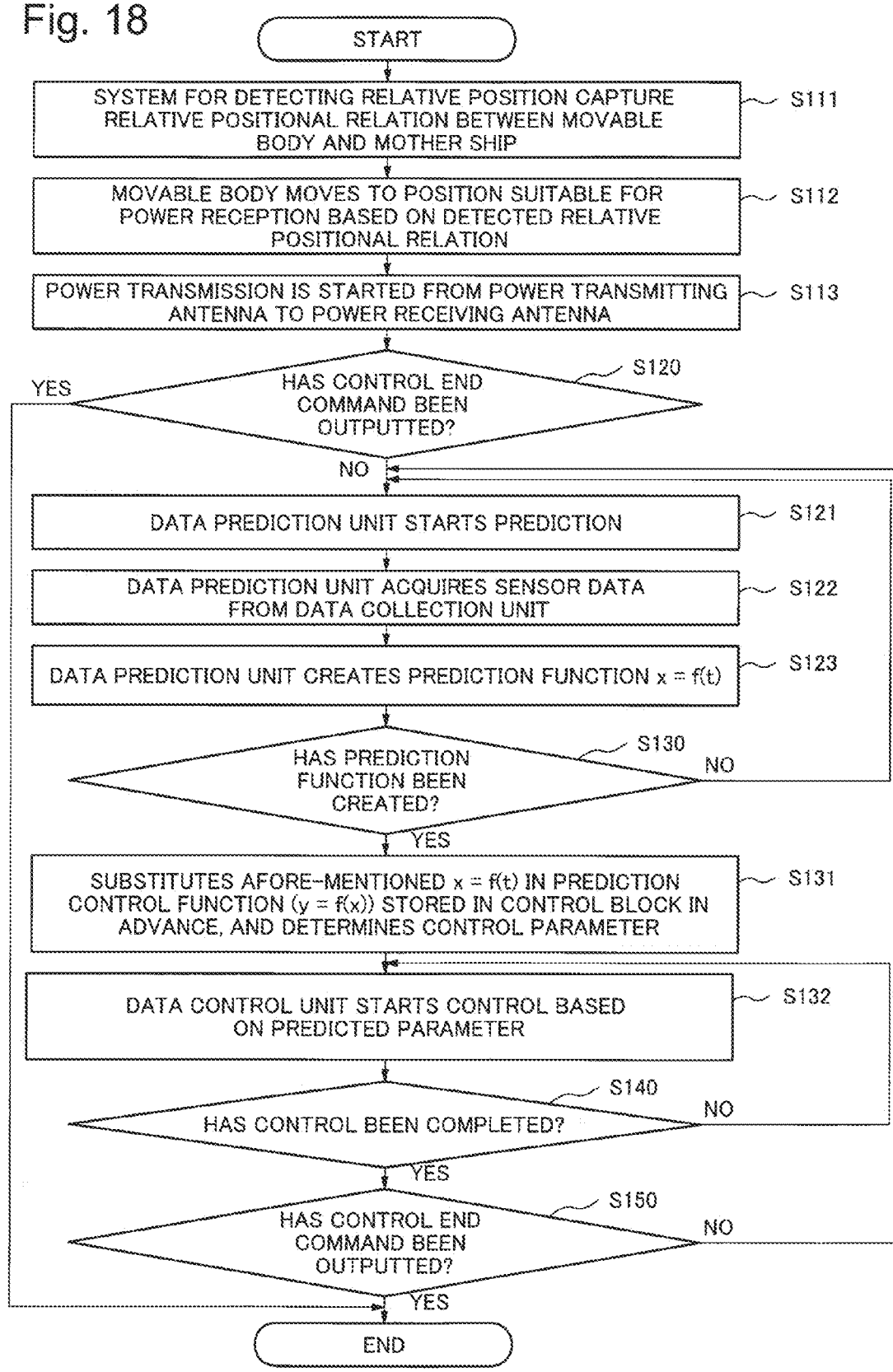
FIG. 18 is a flowchart illustrating an example of an operation flow of a wireless power transmission system according to a modification of a fifth exemplary embodiment of the present invention.

Next, based on the control parameter y estimated by the data prediction unit 63, a parameter control unit 64 controls an antenna control unit 66. In this way, a frequency or a load corresponding to the future motion information x is adjusted. Furthermore, the series of operations is repeated while updating present information. An example of an operation flow according to the modification of the fifth exemplary embodiment is illustrated in FIG. 18.

So far, the present invention has been described with reference to exemplary embodiments (and an example); however, the present invention is not limited to the aforementioned exemplary embodiments (and the example). Various modifications which can be understood by a person skilled in the art can be made within the scope of the present invention.

This application is based upon and claims the benefit of priority from Japanese patent application No. 2014-013892, filed on Jan. 29, 2014, the disclosure of which is incorporated herein in its entirety by reference.

REFERENCE SIGNS LIST 11, 21, 31, 41, 51 Control device
12, 22, 32, 42, 52 Data collection unit
13, 23, 33, 43, 53 Data prediction unit
14, 24, 34, 44, 54 Parameter control unit
15, 25 35, 45, 55 Movable body control unit
16, 26, 36, 46, 56, 66 Antenna control unit
17, 27 37, 47, 57 Movable body
50 Mother ship
221, 222, 223, 321, 322, 323, 421, 422, 423 Sensor
351, 352, 353, 451, 452, 453 Posture control unit
361, 461 Load control unit
362, 462 Frequency control unit
503 Power receiving antenna
502 Power transmitting antenna
504 Movable body battery

The invention claimed is:

1. A control device for wireless power transmission, comprising:
   a data collection unit which acquires data indicating a characteristic of a transmission medium when power is wirelessly transmitted via a power receiving antenna provided to a movable body;
   a data prediction unit which derives a predicted transmission characteristic by predicting a change in the characteristic of the transmission medium by using the data and calculates a control parameter corresponding to the predicted transmission characteristic; and
   a parameter control unit which performs control of the movable body and the power receiving antenna by using the control parameter.

2. The control device for wireless power transmission according to claim 1, wherein the control parameter comprises a parameter for deciding a position of the movable body, a parameter for deciding a frequency of the power receiving antenna, and a parameter for deciding a load of the power receiving antenna.

3. The control device for wireless power transmission according to claim 1, wherein the data collection unit comprises a plurality of sensors that detect the data, and the sensors detect different characteristics of the transmission medium.

4. The control device for wireless power transmission according to claim 1, wherein the control parameter is a parameter that optimizes power transmission efficiency.

5. The control device for wireless power transmission according to claim 1, wherein the control parameter is a parameter with which a response speed in performing the control is optimal.

6. The control device for wireless power transmission according to claim 1, further comprising:
   a movable body control unit which controls a position of the movable body, wherein the movable body control unit comprises a plurality of posture control unit corresponding to each axis of a coordinate system.

7. The control device for wireless power transmission according to claim 1, further comprising:
an antenna control unit which performs control of the power receiving antenna,
wherein the antenna control unit comprises:
a load control unit which controls load of the power receiving antenna; and
a frequency control unit which controls frequency of the power receiving antenna.

8. The control device for wireless power transmission according to claim 1, wherein the transmission medium is seawater and the characteristic comprises at least one of temperature, flow rate, and pressure of the seawater.

9. A control method of wireless power transmission, comprising:
acquiring data indicating a characteristic of a transmission medium when power is wirelessly transmitted via a power receiving antenna provided to a movable body;
deriving a predicted transmission characteristic by predicting a change in the characteristic of the transmission medium by using the data;
calculating a control parameter corresponding to the predicted transmission characteristic; and
performing control of the movable body and the power receiving antenna by using the control parameter.

10. A wireless power transmission system comprising:
a movable body comprising the control device for wireless power transmission according to claim 1 and a power receiving antenna; and
a power transmitting device which wirelessly transmits power to the movable body,
wherein the control device for wireless power transmission determines transmission information comprising a frequency of the wireless power transmission and a target value of power transmission efficiency, and
the movable body transmits the transmission information to the power transmitting device.

* * * * *